Jan. 23, 1962     N. B. WALES, JR     3,018,040
COMBINED BUSINESS MACHINE AND TAPE PERFORATOR
Filed Jan. 27, 1956                    12 Sheets-Sheet 1

INVENTOR.
NATHANIEL B. WALES, JR.
BY
AGENT

INVENTOR
NATHANIEL B. WALES, JR.
BY
AGENT

Jan. 23, 1962 N. B. WALES, JR 3,018,040
COMBINED BUSINESS MACHINE AND TAPE PERFORATOR
Filed Jan. 27, 1956 12 Sheets-Sheet 3

INVENTOR.
NATHANIEL B. WALES. JR.
BY Elmer W. Edwards

AGENT

INVENTOR.
NATHANIEL B. WALES, JR.
BY
AGENT

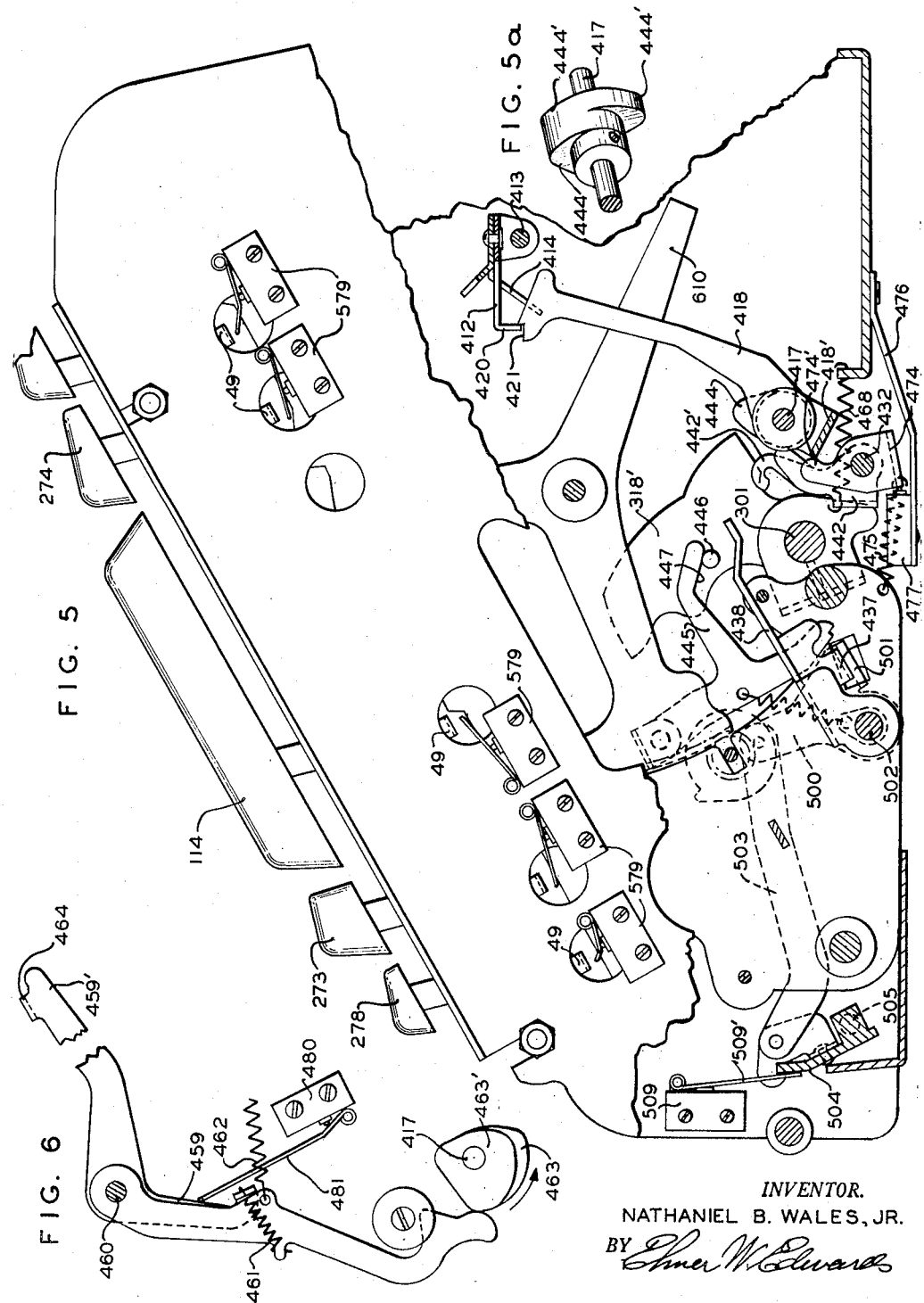

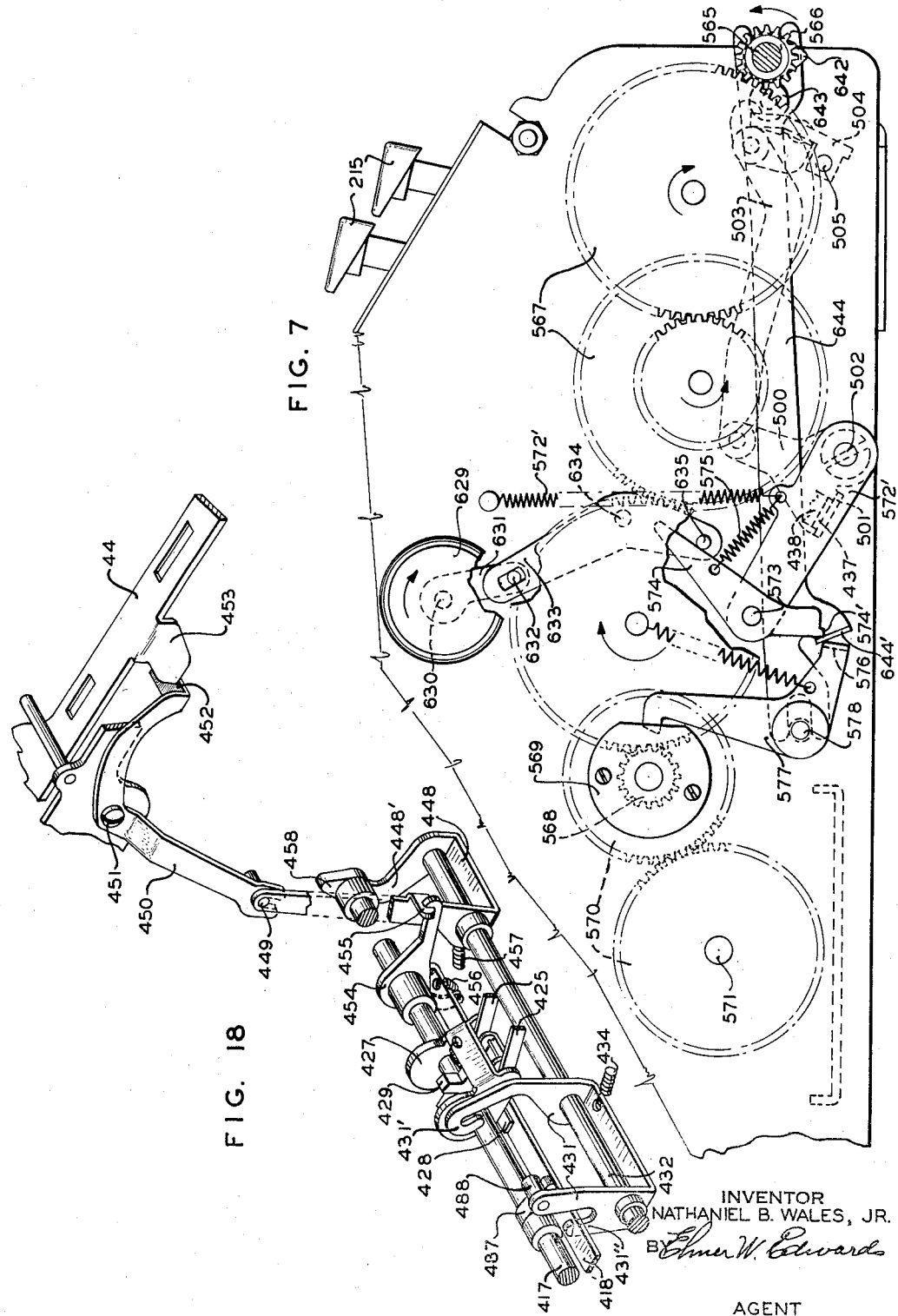

INVENTOR.
NATHANIEL B. WALES, JR.

AGENT

Jan. 23, 1962   N. B. WALES, JR   3,018,040
COMBINED BUSINESS MACHINE AND TAPE PERFORATOR
Filed Jan. 27, 1956   12 Sheets-Sheet 8

*INVENTOR.*
NATHANIEL B. WALES, JR.
BY

AGENT

Jan. 23, 1962 N. B. WALES, JR 3,018,040
COMBINED BUSINESS MACHINE AND TAPE PERFORATOR
Filed Jan. 27, 1956 12 Sheets-Sheet 9

INVENTOR.
NATHANIEL B. WALES, JR.
BY

AGENT

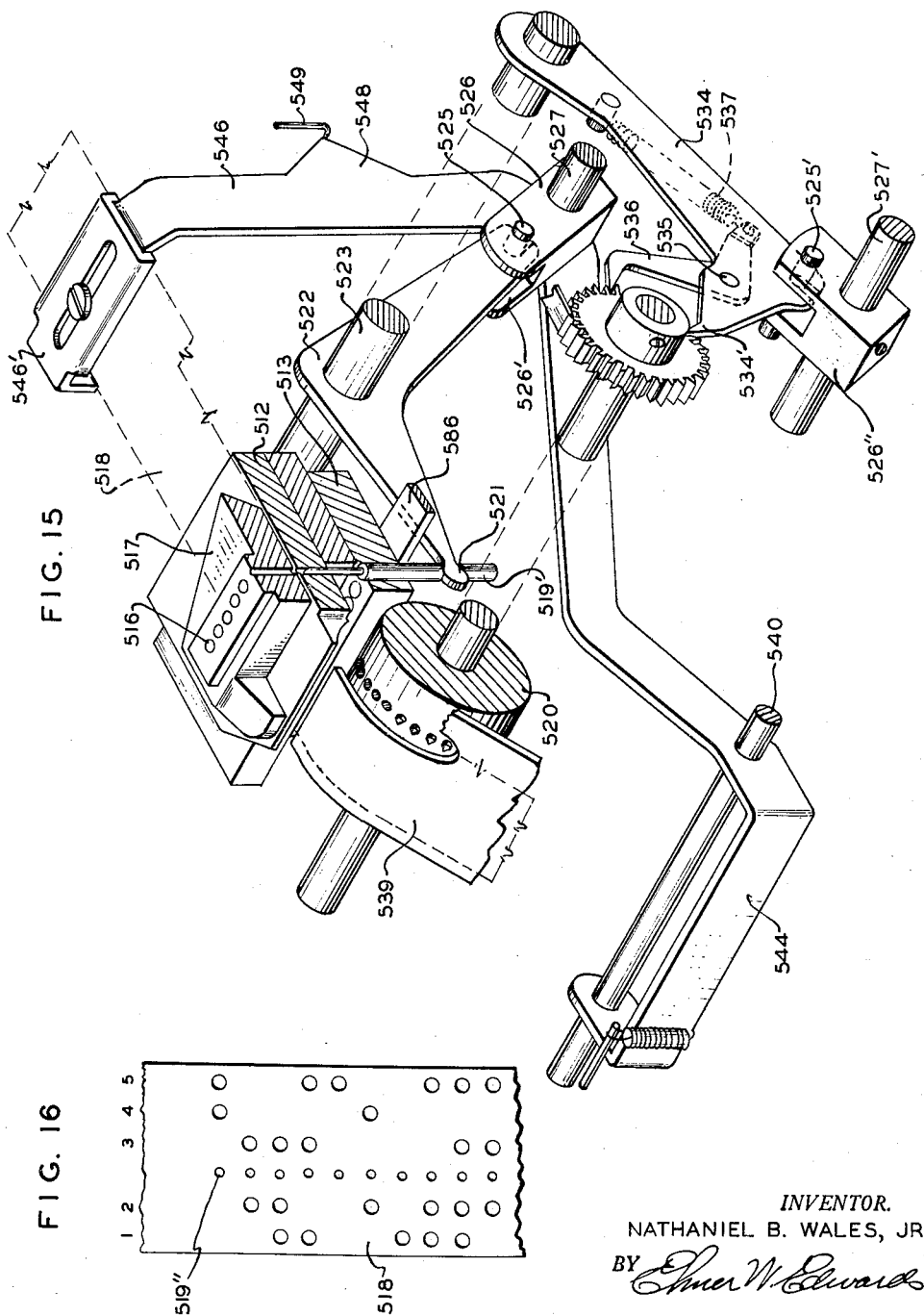

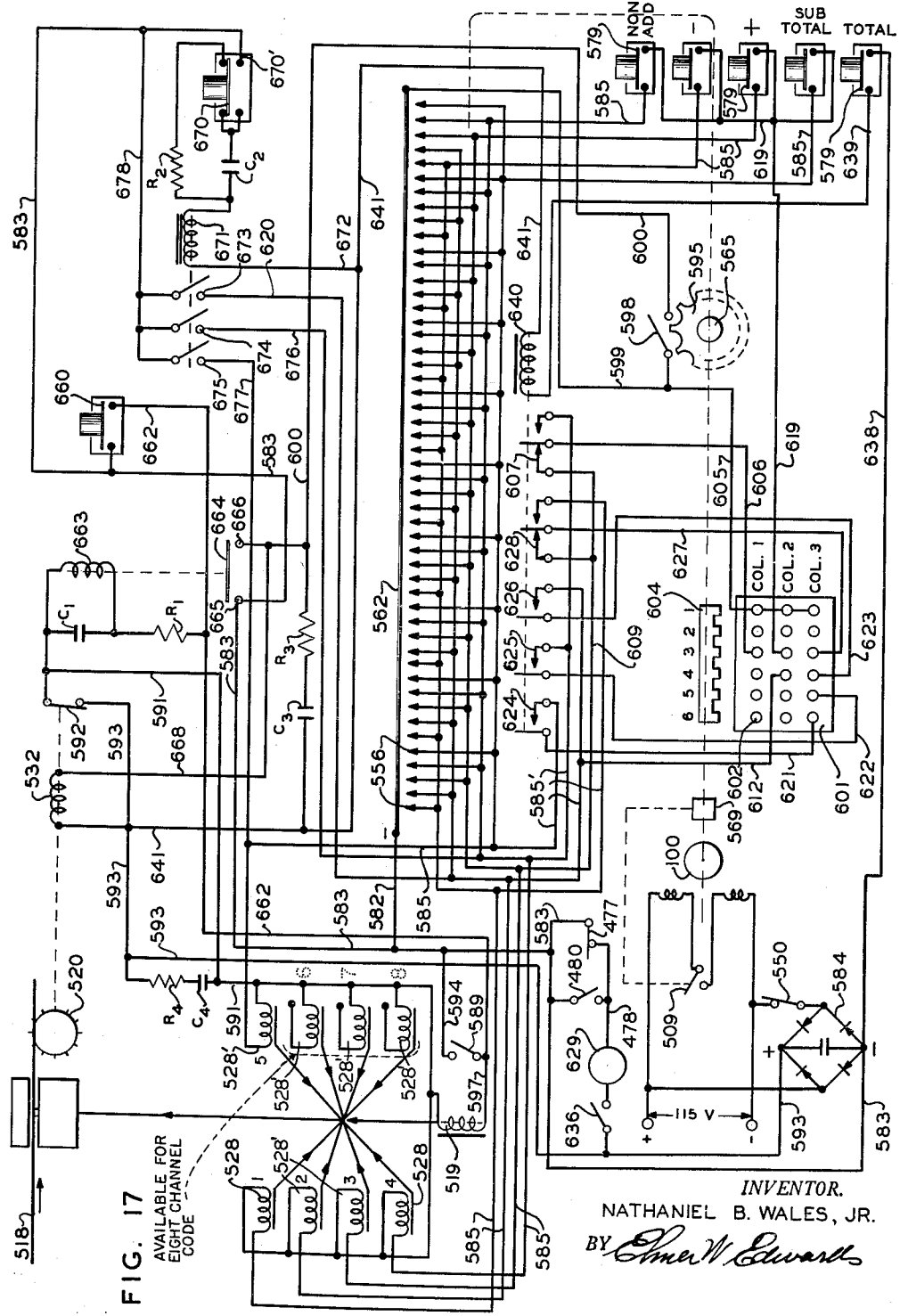

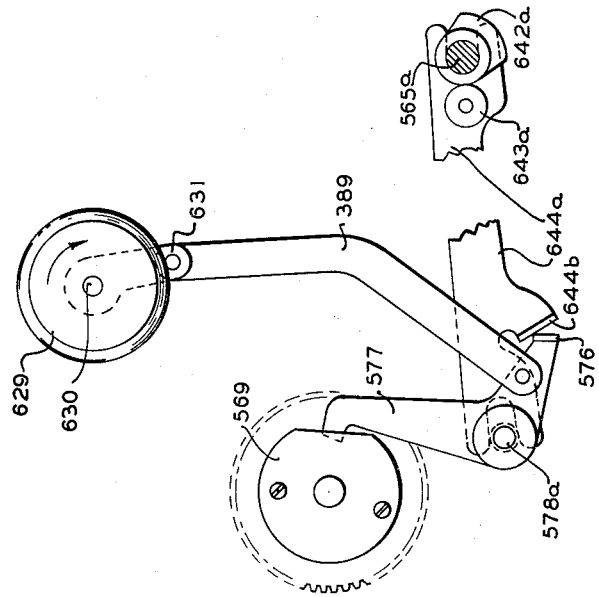
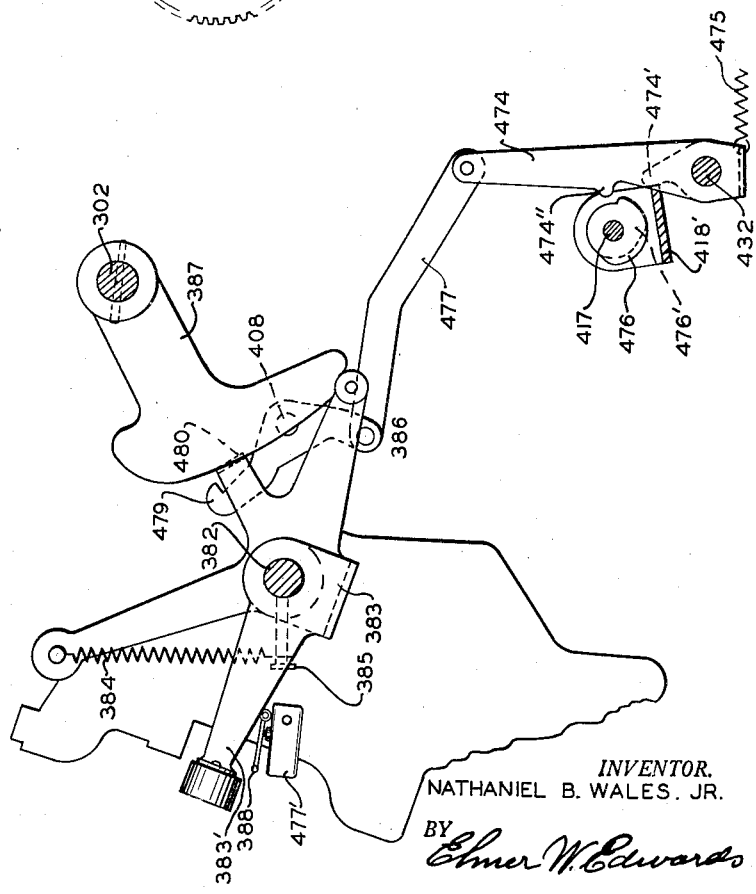

United States Patent Office 3,018,040
Patented Jan. 23, 1962

3,018,040
COMBINED BUSINESS MACHINE AND TAPE
PERFORATOR
Nathaniel B. Wales, Jr., New York, N.Y., assignor to
Monroe Calculating Machine Company, Orange, N.J.,
a corporation of Delaware
Filed Jan. 27, 1956, Ser. No. 561,759
32 Claims. (Cl. 235—60.4)

The invention relates to a combination business machine and tape perforator wherein data, such as items, totals and other transactions entered in a keyboard controlled machine of the lister calculator type is caused to be read out and punched in a tape or other media in an extremely simple and rapid manner to provide a punched coded record of the transactions entered in the business machine.

The invention includes electromechanical means to sequentially read out information, such as symbols and figures entered within the register and/or printing devices of a business machine in accordance with a given system of notation, and to concurrently with said readout operation translate such information into coded combinations of electrical circuits which effect operation of selective punch members adapted to perforate combinations of holes within selective channels of a tape or other media in accordance with a representation of said code. The perforated tape can thereafter be fed into other types of business machines, such as the well-known teletype machines, for transmitting information to various destinations, or into machines which act to relay the information to punch tabulating cards, etc.

The invention provides a combination business machine and tape perforator light in weight to be easily transportable and which is constructed within a single base wherein all wiring is contained to facilitate the safety and handling thereof.

One object of the invention is the provision of extremely simple, light and compact mechanical encoding devices whereby selected displacement of the actuator devices of a business machine in effecting entries therein in accordance with a given system of notation is directly translated into a coded representation of said displacement.

Improved means are also provided for converting said coded representations into electrical circuits corresponding thereto.

Another object of the invention includes the provision of means whereby said translation and conversion is effected without the addition of frictional loads upon said actuator devices.

Another object of the invention provides novel sensing and sequential readout devices for the said encoding means.

Another object of the invention resides in the provision of a plurality of punch devices operable in uniform moments of inertia and responsive to said electrical circuits during a sequential readout sensing operation for effecting perforations within selective channels of a tape or other media in accordance with said translated coded representations.

As another object the invention provides a geometry of linkages between the punches in a punch and die set and the electromagnets adapted for actuating said punches whereby a maximum of compactness is achieved together with a simplicity of manufacture.

The invention also provides means to effect coded perforations in the tape to represent certain functions which may be selectively effected in the lister calculator such as non-add, subtract, add and totalizing operations.

The invention as a further object includes provision of control means responsive to an operation of true negative total devices whereby the operations of the translating and punching devices are caused to be rendered ineffective throughout a series of related operations of the actuator devices and until rendered effective in a given cycle of operation thereof.

Other objects and advantages of the invention will be apparent from the following description and claims and as illustrated in the accompanying drawings which discloses, by way of example, the principle of the invention and the best mode which has been contemplated of applying that principle.

In the drawings:

FIG. 5 is a right-hand elevation, the framing being broken away, showing parts of the true negative total devices which serve to disable operations of the code translator and punch devices during certain cycles of negative total operations.

FIG. 5a is a detail perspective view of a control cam used in negative subtotal control operations.

FIG. 6 is a detail view of a portion of the negative total devices which act to reenable the translator and punch devices.

FIG. 7 is a left-hand elevation of the drive and clutch control means for operating the sequential readout devices, which in turn effect operations of the tape punch devices.

FIG. 15 is a right-hand perspective view of the tape advancing means and feed punch.

FIG. 16 is an illustration of a five channel coding tape.

FIG. 17 is an electrical wiring diagram of the machine as applied to a five channel code.

FIG. 18 is a left-hand perspective of devices for effecting a plurality of machine cycles in negative total operations.

FIG. 19 is a left-hand elevation showing a modified means for magnetically controlling release of the clutch means shown in FIG. 7.

FIG. 20 is a detail view of circuit switch control means for said modified means, automatically operable in an operation of the register/printing cyclic devices.

Figure 1:
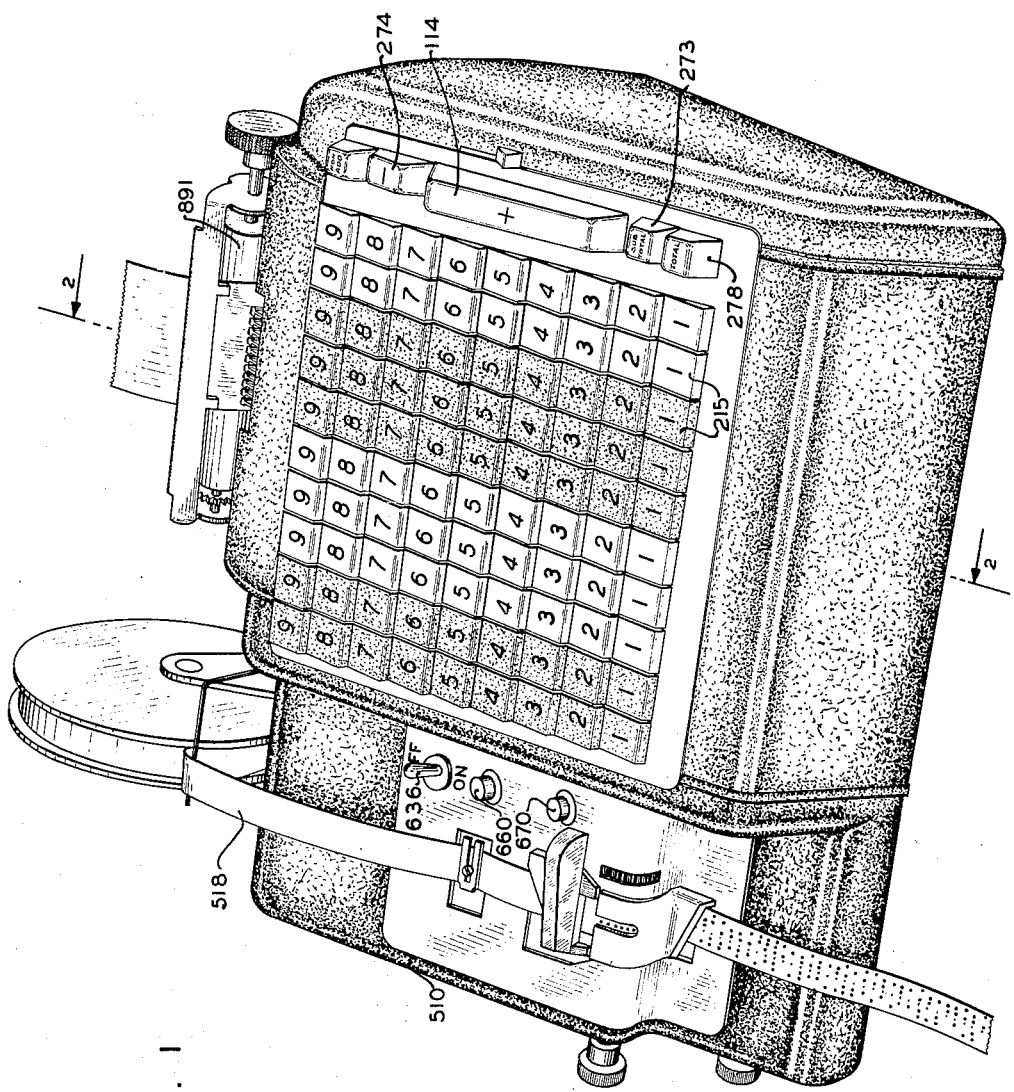
FIG. 1 is a perspective view of a machine embodying the invention.

For convenience the invention is shown as applied to a business machine of a well-known lister calculator type employing registering and printing devices which are operable under control of reciprocatory actuator devices differentially settable to well-defined positions indicative of a zero and 1 to 9 digit values representative of the decimal system of notation. Such a machine is disclosed in its essential features in U.S. Patent #1,915,296 issued June 27, 1933 to Loring P. Crosman, as modified by the disclosures of Patent #2,330,270 issued to Loring P.

Crosman January 5, 1943 and Patent #2,645,417 issued July 14, 1953 to Howard M. Fleming, to which reference is made for details of structure and operation not herein set forth.

Adding and subtracting

As set forth in the above reference patents, amounts set up on digit keys 215 (FIGS. 1 and 2) for each denominational order are transferred additively or subtractively upon operation of plus key 114, or minus operating key 274, to a series of accumulator wheels 473 by means of a series of spring operated differential actuators 610 loosely mounted upon a transverse shaft 608. The forward arm of each differential actuator lever 610 is provided with segmental rack teeth, adapted to mesh with the pinions 472 of the series of accumulator wheels 473. Index bars 615 are pivotally connected with the upper arms of levers 610, these index bars being moved, upon counterclockwise rotation of the levers, into engagement with the stems of selectively depressed keys 215. Type bars 611 are pivotally connected to the rearward arm of levers 610, the type bar being provided with a longitudinally disposed series of type representing the digits 0 and 1 to 9.

The digit keys 215 which have been depressed to represent a value are latched in position with the bottoms of their stems lying in the path of movement of the related stop lugs of the bars 615, allowing such bars to advance a distance proportional to the value of the keys upon operation of the machine. Depression of a digit key will also remove a column latch 214 from the path of movement of its selected stop bars 615 these latches preventing movement of a stop bar and levers 610 in any column in which no key is depressed. Each of the racks 610 are held in their normal clockwise position against tension of their respective springs 683, by a stud 659 fast in said racks and having engagement with a series of dogs 617 pivotally mounted upon transverse rod 618 supported within a rocker frame 616 loosely mounted on the shaft 608.

A rock shaft 301 is oscillated by means of an electric motor 100 connected through suitable gearing and clutch means 103—104 (FIG. 3) with a rock arm 316, fast with shaft 301 by means of a connecting rod 108, so that as a crank arm 105 is rotated by the motor shaft 301 will be oscillated.

Rock shaft 301 is provided with cam means 318 (FIG. 2) for governing the movement of frame 616. As shaft 301 is rotated forwardly, cam 318 will permit frame 616 under influence of spring 616' to be rocked counterclockwise and any of the levers 610 which have been released by the depression of digit keys 215 will be allowed to rotate under influence of their springs 683 until they are stopped by the lugs of bar 615 contacting with the stems of the depressed keys. Upon rearward return movement of shaft 301 cam 318 will restore frame 616 and the dogs 617 will return the operated levers 610 to normal position. This excursion of the levers 610 serves to register amounts set in the keyboard upon one or more accumulators 473 and to set up a similar amount on the printing line of the type bars.

Release of clutch pawl 103 is effected upon depression of the motor keys, the stems of which are provided with a cam surface 40 (FIGS. 3 and 4) acting upon depression of a key to move a slide 41 forwardly thereby operating a bell crank lever 42 raising roller 43 of said lever out of engagement with a suitable opening in a spring operated slide 44. Slide 44 is provided with a lug 45, which, upon depression of an operating key and subsequent forward operation of slide 44, engages the upper arm of a pivot latch 112, thereby releasing said latch from clutch control lever 106, whereupon said lever will be moved counterclockwise by its spring 89, and an insulation roller 109 on said lever will act to close a switch 110 in the circuit of the electric motor. In this movement the lower end of lever 106 will be disengaged from the tail of the spring urged clutch pawl 103, and allow said pawl to fall into engagement with the drive clutch member 104 to effect a machine cycle of operation.

During a cycle of operation the wheels of the accumulators 473 are rotated subtractively upon the forward stroke or additively upon the return stroke of the actuators 610, there being an actuator lever 610 and an associated accumulator wheel for each order provided in the machine. The timed meshing and unmeshing of the accumulator gears as well as other functions, are effected under control of various spring slides 74, 81 and others lying beneath pivoted bails 49, depressible by their related machine operating key to control the extent of forward movement of said slides, as fully described in U.S. Patent #2,330,270 of reference.

Figure 2:
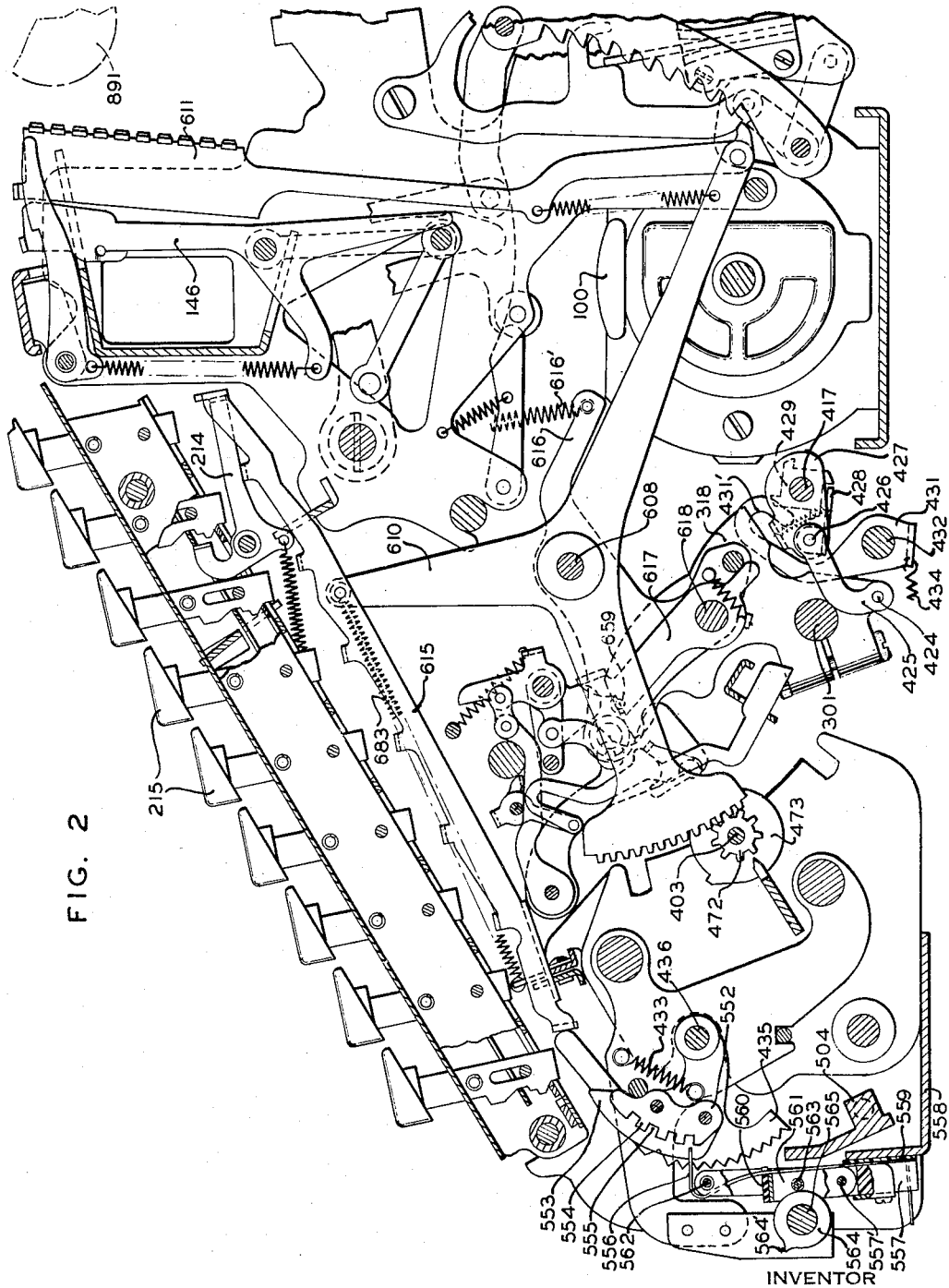
FIG. 2 is a section taken substantially on line 2—2 of FIG. 1, showing the keyboard, registering/printing and code translating devices.

As shown in FIG. 2 the accumulator pinions 472 stand normally in mesh with the segment gears of actuators 610, the accumulator shaft 403 being mounted in guide slots of the machine frame so that the accumulator assembly may be moved radially of the actuators, to mesh and unmesh the pinions 472. Shaft 403 is adjusted by means of toggle linkage 10 (FIG. 4) one member of which is fast upon a rock shaft 2. The linkage is held in either of two adjusted positions by a toggle spring 11. Fast upon shaft 2 is a plate 419 (FIG. 3) having yieldable spring connection 4 with an arm 5 provided with a lateral flange 22. Pivoted at 33 upon said arm is a cam switch 6 which, with flange 22 of arm 5, lies in the plane of a roller 7 fixed upon lever 316.

In additive operations roller 7 will contact cam surface 21 of switch 6 and thereafter with the rear end of flange 22, whereby arm 5 will be raised, thus rocking shaft 2 and linkage 10, to unmesh the pinions 472 of the accumulator before the actuators are allowed to move. During the continued forward movement of the actuators 610 arm 5 will be held in raised position by engagement of roller 7 with the lower surface of flange 22. At the end of the forward stroke, roller 7 will lift the forward end of switch 6 away from a lug 20 of arm 5, and will thereafter move out of contact with the switch, which will return under influence of a spring 75 into normal relation with the arm. Upon the return stroke of the operating mechanism, roller 7 will engage a cam surface 23 of switch 6, restoring arm 5 and the parts 419, 10 and 403 to original position, remeshing the pinions 472 with the segments 610 to effect the registration.

Each numeral wheel unit is connected to the higher order numeral wheels by tens transfer mechanism of the "crawl" carry type such as described in U.S. Patent #1,828,180 issued to Clyde Gardner on October 20, 1931, as modified by the disclosure of U.S. Patent #2,450,787 issued October 5, 1948 to Howard M. Fleming.

As also disclosed in the patents of reference, during a machine cycle of operation and near the end of a forward stroke of the actuators 610 suitable printing hammers 146 are caused to be released to effect a printing in accordance with the displacement of actuators 610 and type bars 611 upon a record tape inserted around the usual platen 891.

The forward movement of slide 44 to engage the clutch also serves to lock any of the operating control keys in their depressed position, by engagement of said slide with a shoulder 46 of the key stems, thus holding the key in depressed position until restoration of slide 44, as hereinafter explained. Near the end of a cycle of operation of the machine, and after actuators 610 have been brought to rest, well-known means release the set digit keys 215 and the depressed operation key, disengages the clutch and restores the various control elements to normal position. For this purpose an antifriction roller 65' mounted on a lever 65 will be engaged by a cam projection of plate 105, and rocked clockwise against tension of a spring 66 secured at one end to lever 65 and at its other end to a fixed frame of the machine. A pivoted lever 67 has yieldable connection with lever 65 through means of a spring 68, lever 67 extending upwardly and into the path of movement of the lug 45 of slide 44. Displacement of lever 65 by the cam edge of the plate 105 will therefore retract slide 44 to and rearwardly beyond its normal position of rest, the extra rearward movement being utilized to clear the digit keyboard as fully set forth in the reference patents. Retraction of slide 44 will also unlock the operation keys and will allow roller 43 to again fall into latching engagement with said slide.

In the above-described restoral of slide 44, the lug 45 will permit latch 112 to fall and rest upon the projection 106' of latch 106. Near the end of the clockwise movement of lever 65 a projection 65" thereof engages and rocks lever 106 into the path of movement of clutch pawl 103 to disengage said pawl from driving member 104, whereupon latch 112 reengages projection 106' terminating the cycle of operation.

*Total and subtotal*

As well-known and fully set forth in the reference patents, in machines of this type, totals are printed by first disengaging the actuators 610 (FIG. 2) from their column latches 214 and thereafter from the frames 616 by tripping dogs 617 in successive order from right to left, allowing the racks to move subtractively under influence of springs 683 to rotate the accumulator wheels to zero, in which position the wheels are held by engagement with appropriate stops. Following this, the cycling of the machine will effect operation of the printing means at the end of the forward stroke of the operating means and thereafter frame 616 will pick up and return the actuators to normal position. Successive release of the racks 610 is essential because of the character of the tens transfer mechanism employed between the accumulator wheels, i.e., the "crawl" carry type, wherein every unit of movement of a lower order wheel transmits one-tenth of a unit of movement to the next adjacent higher order wheel. Therefore, in zeroizing, as each lower order wheel is returned to zero, it will subtract from the higher order wheel the fractional movement previously transmitted.

The above and other special functions are effected upon depression of the total key 278, under control of the spring slides 74, 81 lying beneath the pivoted bails 49, depressible by their related machine operating key to control the extent of forward movement of said slides, as will now be described.

Depression of total key 278 will release slide 44 (FIG. 3) to start motor operation, as previously described for the other keys, and will permit a full movement of the slide 74 to set the operation control means 6 for subtractive operation, that is to say, the accumulator pinions 472 will be left in mesh during the zeroizing operation, and will be unmeshed before the additive stroke of the actuators 610 is effected.

It is desired to effect the various adjustments of the controlling mechanisms by power from the motor and consequently upon depression of the total key the clutch will be allowed a limited driving movement and then motor operation will be interrupted to give time for the completion of the zeroizing operation, at the conclusion of which the clutch will be reengaged and the cycle of operation completed. For this purpose slide 81 (FIG. 4), which is blocked against operation when bails 49 related to other operating keys are depressed, will be allowed to operate, i.e., move forward, upon depression of the total key, under influence of spring 82. Slide 81 is pivotally connected with a link 83 having pin and slot connection with a latch 84.

Forward movement of slide 81 is effected simultaneously with forward movement of an arm 76 (FIG. 3), oscillated during each cycle of operation of crank arm 105, and link 83 is moved downwardly, tensioning a spring 85 which then tends to move latch 84 clockwise about its pivotal support. The free end of latch 84, however, engages a spring pressed arm 86, pivoted upon the machine framing and having an antifriction roller 86' engaging the cam edge of crank 105. During the first part of the cycle of operation, roller 86' of arm 86 will ride to and beyond the high point of the crank 105, as the latter rotates, rotating arm 86 clockwise and allowing latch 84 to fall into a notch formed in the upper end of said arm maintaining the arm in rocked position. A rearward extension 87 of arm 86 is thus held by latch 84 in the path of rotary movement of the clutch pawl 103. Engagement of the pawl with extension 87 serves to disengage the pawl from the drive member 104 of the clutch and to hold it in disengaged position.

Slide 81 also has link connection 88 with an arm 134 pivoted upon a transverse rod 135 mounted in the right and left machine frames and provided with a finger 133 which is brought during the movement of slide 81 into contact with a stud 350 fixed in a lever 351 fulcrumed at 352 upon a support arm 353 pivotally mounted on a shaft 354 supported within suitable fixed framing of the machine.

Engagement of finger 133 with stud 350 will impart clockwise movement to lever 353 about shaft 354, to effect operation of the successive zeroizing devices as more fully set forth in Patent #2,261,341 issued November 4, 1945 to Loring P. Crosman.

When the highest order accumulator wheel is rotated to its zero position, the zeroizing means imparts clockwise movement through suitable link connection (not shown) to a transverse shaft 379 upon the right end of which is an arm 380. Arm 380 is provided with a projection 381, adapted in said movement to engage the lower end of latch 84 and rock said latch out of restraining engagement by its spring 86 out of engagement with clutch pawl 103, permitting said pawl to reengage clutch member 104 to restart the interrupted cycle and effect a printing operation of the hammers 146 in the well-known manner set forth in the patents of reference.

Subtotal key 273 operates precisely in the manner of total key 278 except that slide 74 (FIG. 3) is held in a partially operated position by engagement of the bail 49 related to the subtotal key with a shoulder 77 of the slide. Thus switch 6 is held in position for a non-add operation whereby the total subtracted from the accumulator wheels is restored thereto during the return stroke of the operating mechanism, all well-known to the art and described in the reference patents.

*True negative totals*

Overdraft control devices are provided wherein a movement of the highest order (9th column) actuator levers 610 from its 8 to 9 index position will control the means for converting a negative total (registered as a complement of a true negative total) to a true negative total registration and thereafter printing it as such.

Whenever a negative total value has been accumulated upon the register wheels 473, a successive zeroizing operation of the register wheels will include a complemental nines registration carried up to the highest order wheel, and a movement of the highest (9th column) order actuator 610 with its type bar 611 to the nine digit printing position will be utilized to set the true negative total devices into operation in the manner similar to that as set forth in Patent #1,915,296 issued to Loring P. Crosman, June 27, 1933 and as modified by the disclosure of reference Patent #2,645,417.

As described in said patent the method of converting a complemental negative total to a true negative total involves three subtractive cycles of motor operation and two total setting actions of the zeroizing devices.

A set of stops 435 (FIG. 2) yieldably engaging the stop bars 615 of actuator segments 610 are locked in position as adjusted thereby in accordance with the complemental registration and segments 610 are thereafter restored idly to normal position during the first cycle of operation. The segments are now again released and will be stopped by the stops 435, the accumulator 473 being meshed during this subtractive stroke of the segments, whereby the complement is subtracted from zero giving a registration of the true negative total. The segments 610 are again restored idly to normal position by a cycle of operation of frame 616 and the stops 435 are released, so that a second zeroizing operation will now transfer the true total to the type bars. The printing of the total, which normally occurs at the end of the first total setting operation has in this case been delayed and will occur after the true total is set. The true negative total control devices are set forth in detail in the above reference patents and will therefore be described but briefly herein as follows. Loosely mounted upon a transverse shaft 413 (FIG. 5) is a rock plate 412 provided with a lug 414 on the forward edge thereof, said lug being positioned in the path of movement of the highest (9th) order actuator rack 610. A transverse shaft 417, suitably journaled within the left and right hand frames of the machine has loosely mounted thereon an upwardly extending lever 418, the lower end 418' (FIG. 18) of which is bent toward the right and then upwardly and around shaft 417. Lever 418 is latched in counterclockwise position as seen in FIG. 5 by the engagement of projection 420 of rock plate 412 with the notched surface 421 of said lever. The 9th order actuator rack 610 in moving from 8 to 9 index position will engage lug 414 of rock plate 412 and impart a clockwise rocking movement to the plate 412, thereby lifting projection 420 out of engagement with lever 418 and permitting a counterclockwise movement of said lever. Counterclockwise movement of lever 418 will set certain control devices for negative total operations, including means for indexing the shaft 417 a quarter of a revolution during a cycle of operation.

Rock arm 318 (FIG. 2), cyclically operable as previously described, has fast thereon a stud 424 on which is pivotally mounted parallel links 425. The opposite end of links 425 are pivotally connected to a rod 426 mounted within the end portions of a lever 427, also U-shaped and loosely mounted on the shaft 417. Fulcrumed on rod 426 is a pawl 428, spring held against the peripheral diameter of a four tooth ratchet wheel 429 secured to the shaft 417. During each machine cycle of operation, a reciprocatory movement is imparted to lever 427 and to pawl 428 about shaft 417. In operations other than when a negative total is to be printed, pawl 428 during this movement will be prevented from engaging with the teeth of ratchet wheel 429 by entering the recessed end 431' of a hook-shaped lever 431. Lever 431 is loosely mounted upon a transverse shaft 432 and is held normally in position to receive pawl 428 by an arm 431" (FIG. 18) of lever 431, extending through a suitable orifice of the crossover part 418' of the normally latched lever 418.

Upon release of lever 418 in a negative total operation, in the manner above set forth, a spring 434 will rock lever 431 clockwise as viewed in FIG. 2, whereupon the end 431' thereof is moved beyond the path of movement of pawl 428, and said pawl in its return movement during the later half of a machine cycle will engage a tooth of ratchet wheel 429 to impart a quarter turn to the cam shaft 417.

Fast upon shaft 417 are various cam members which are adapted to perform certain functions during negative total operations, as fully set forth in the above reference patents.

For each order register actuator 610 provided in the machine, there is a stop member 435, loosely mounted upon a transverse shaft 436 journaled within the framing of the machine. Each stop member is adapted for engagement by the forward end of the index bar 615 of its corresponding order actuator rack 610 so that a movement of said racks to register a value and to bring its related type bar to printing position will be imparted to its related stop member 435. During the first zeroizing operation therefor, rack arms 610 in clearing the register wheels 473 to zero will adjust the stops 435 according to the complemental value accumulated upon the register.

Near the end of the forward stroke of the first cycle of operation, an arm 318' (FIG. 5) fast to rock shaft 301 will engage the projection 437 of a rearwardly extending lever 438, loosely mounted upon a stub shaft 502 supported within the left side frame, rocking said lever downwardly. Projection 437 of lever 438 overlies a projection 501 of a bell crank 500 fast upon stub shaft 502 as shown in FIG. 7. Bell crank 500 has link connection 503 with a transverse bail 504, pivotally supported at 505 within the side framing of the machine, and positioned forwardly of the stop members 435 as shown in FIG. 2. Downward movement of lever 438, therefore, imparts counterclockwise movement, as viewed in FIG. 7, (clockwise in FIGS. 2 and 5) to bell crank 500, and through link 503 will act to rock bail 504 into engagement with the serrated edges of stop members 435, thereby locking said members in their value adjusted positions.

Loosely supported upon shaft 432 is a frame 442 (FIG. 5) formed as a hook 442' at its left end, said frame being positioned in the path of movement of a cam member 444 fast to the cam shaft 417. During the first quarter turn of shaft 417, in the return stroke of the first operating cycle, cam 444 will rock hook 442' of frame 442 into engagement with arm 438 and latch said arm in depressed position, thereby locking the stops 435 in their adjusted positions, until subsequently released during the return stroke of the second cycle of operation as will be described. A suitable spring tensioned latch 445 will engage projection 437 of lever 438, as said lever is rocked downwardly at the end of the forward stroke of the operation to hold said lever in depressed position while the engagement of hook 442' therewith is being effected in the return stroke. Latch 445 is thereafter disengaged from projection 437 at the end of the return stroke of rock arm 318' by means of a pin 446 in said arm engaging the cam surface 447 of said latch.

Near the end of a cycle of operation, the crank arm 105 (FIG. 3) acts through a bell crank 76 to restore the operating control slides 74 and 81 to their rearward positions and it will be recalled that said crank through bell crank 65 (FIG. 4), spring 66 and lever 67 also restores operating slide 44 to permit reengagement of latch 112, with clutch lever 106 to terminate a machine cycle of operation. Also, as earlier described restoration of slide 44 to and beyond its normal rearward position acts to clear the keyboard including a depressed operating key.

So that the machine may continue in cycles of operations, slide 44 is caused to be latched in forward operating position until the end of the third or printing cycle of operation as follows. Loosely mounted upon shaft 432 (FIG. 18) is a U-shaped lever 448, one end of which has pin and slot connection 449 with a lever 450 fulcrumed to the framing at 451. Lever 450 is provided with a lug 452 normally held in a lowered position out of the path of movement of a projection 453 of the operating slide 44 through means of a latch 454 having engagement with a lug 455 of lever 448. Latch 454 is loosely mounted upon shaft 417 and is held in engagement with lug 455 by a spring 456 connected between said latch and the cross member 418' of lever 418. Upon a clockwise (FIG. 18) movement of lever 418, previously described, the rearward edge of crossover 418' will rock latch 454 downwardly out of engagement with lug 455, permitting a clockwise movement of lever 448 by its spring 457 until stopped by the engagement of end 448' of said lever with the lower peripheral diameter of a cam 458 fast to shaft 417. The above movement of lever 448 rocks lever 450 to carry lug 452 upwardly into the path of return movement of projection 453 of slide 44 to thereby prevent a return movement of the slide, and the total key will thus remain in its depressed position. Also, a relatching of clutch lever 106 (FIG. 3) by latch 112 is thereby prevented and lever 106 under influence of its spring 89 rocks out of the path of cyclic movement of clutch pawl 103 before engagement of said pawl with lever 106 can be effected. This permits a second cycle of operation during which slide 74 again conditions the operation control means for a subtractive operation.

To prevent a tripping of the zeroizing devices during the second cycle of operation, the control slide 81 (FIG. 4) will be held in returned rearward position as follows.

Figure 4:
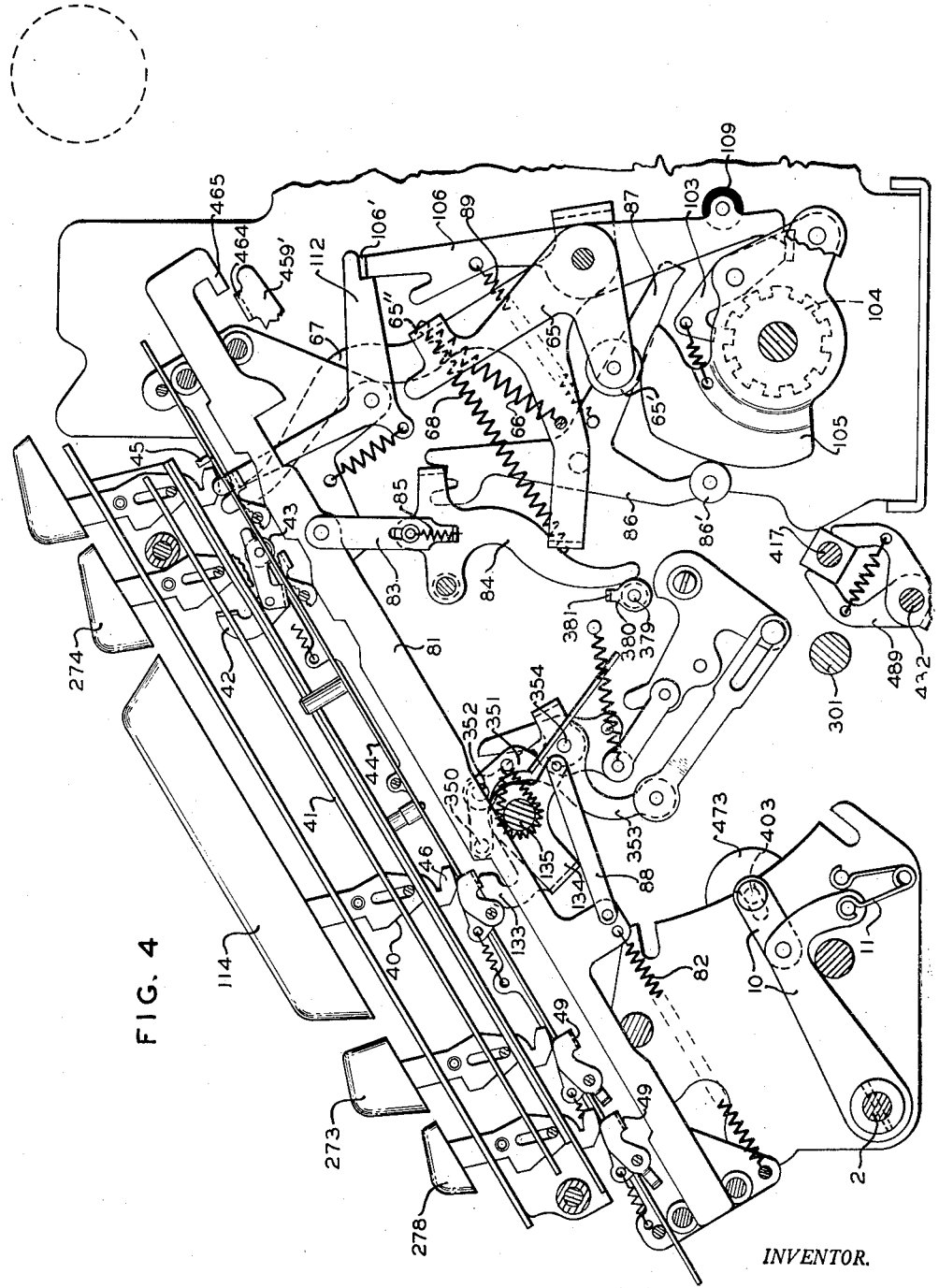
FIG. 4 is a right-hand elevation showing the accumulator zeroizing slide and associated total taking mechanism.

A bell crank lever 459 (FIG. 6) is fulcrumed at 460 upon the right-hand frame of the machine, and is held against a counterclockwise urge of its spring 462 through contact with the largest peripheral diameter of a cam 463 fast to the shaft 417. The rearward arm 459′ of bell crank 459 is provided with a lug 464 which extends beneath the zeroizing control slide 81, as illustrated in FIG. 4, and is normally held by cam 463 in a downward position out of the path of forward movement of a projection 465 formed on the underside of the rearward end of said slide 81.

Indexing of shaft 417 one quarter turn during the first cycle of machine operation, however, will rotate cam 463 bringing an intermediate peripheral diameter surface of said cam opposite bell crank 459, which will permit a partial movement counterclockwise of arm 459′ and, as cam 105 subsequently restores slide 81 to its rearward position, the lug 464 will first engage the under surface of projection 465, and thereafter will rise into position to block a forward movement of projection 465, thus holding slide 81 in its rearward position during the second cycle of machine operation.

During the second cycle of operation, rack arms 610 (FIG. 2) are limited in their forward movement by the stops 435, as earlier set forth, and will subtract the complemental value stored in said stops from the cleared register, thereby leaving a true negative total value stored in the register. On the return movement of the second cycle of operation cam shaft 417 will again be indexed by pawl 428 a quarter turn to thereby condition the parts for a third cycle. Indexing of shaft 417 during a second cycle of operation also rotates cam 444 (FIG. 5) away from hook arm 442′ permitting frame 442, under influence of its spring 468, to rock hook 442′ out of engagement with lever 438, and near the end of the cycle pin 446 releases latch 445 from projection 437 so that locking bail 504 will be rocked out of engagement with stops 435 permitting said stops to be restored to their normal zero setting positions by their respective springs 433.

Printing and line spacing will be held in abeyance for the first two cycles of a negative total operation as fully described in U.S. Patent #2,645,417 of reference.

Clutch operating slide 44 (FIGS. 3–4) being latched in its forward releasing position by lever 450 (FIG. 18), the machine will continue to operate for a third cycle during which the operating control slides 74 and 81 are again caused to move forwardly and control the character of registration and tripping of the zeroizing means, all as in the manner set forth for the first cycle of operation. Operation of the zeroizing means incident to the third cycle of operation, however, now positions the type bars 611 according to the true negative total value stored in the register wheels 473. Thereafter printing and line spacing are effected during the third cycle of operation, in which the true negative total value is printed upon the record sheet at the end of the forward stroke of said cycle of operation, while suitable paper feed devices are operated during the return stroke, in the well-known manner as set forth in said reference patent.

The following means are provided to index cam shaft 417 a quarter turn to its three-quarter turn position during a forward stroke of the third cycle of operation, following which the regular indexing means will operate on the return stroke to rotate the shaft a fourth quarter turn to its normal position, all as described in detail in the above reference patent.

Loosely mounted upon shaft 417 is a U-shaped lever 482 (FIG. 3) within the end supports of which is pivotally mounted a pawl 483 held by means of spring 484 against a one tooth ratchet wheel 485 fast to the shaft 417. Lever 482 has link connection 486 with the power operated arm 316, so that during a forward movement of said arm the lever 482 will carry pawl 483 in an arc around wheel 485, equivalent to one-quarter turn, and thereafter is returned during the return movement of arm 316. The tooth 485′ of ratchet wheel 485 is normally in the position illustrated in FIG. 3, out of cooperation with pawl 483 during the first and second cycles of operation. At the end of the second cycle, however, shaft 417 having been rotated a half revolution, the tooth 485′ will have passed under pawl 483 and will be in the position illustrated by dotted lines. During the forward stroke of a third cycle therefore, pawl 483 will engage tooth 485′ and rotate shaft 417 from its half to a three-quarter rotated position.

During the final quarter operation of shaft 417, a cam 487 (FIG. 18) secured thereon will wipe past roller 488 of lever 431, restoring said lever and, through projection 431″, the overdraft control lever 418 to their normal positions, wherein lever 418 will again be reengaged with latch 420 (FIG. 5), and hold lever 431 in the position to prevent operation of shaft 417 by the indexing pawl 428. Restoral of lever 418 will also permit reengagement of latch 454 with lug 455 of lever 448 prior to the release of said lever from the high part of cam 458, and all parts are now again at their normal position of rest. A suitable spring tensioned locator means 489 is provided as shown in FIG. 4 to hold shaft 417 in each of its indexed positions.

The structures of the lister calculating machine above set forth are well known to the art and reference may be had to the above referred to patents for such details of structure and operation as deemed not to be necessary of describing herein.

*Tape punching unit*

It is desired that a record of the amounts entered within the register devices of the lister calculator and as printed thereby upon the record sheet are to be made also upon a record tape, by means of perforations to be punched in said tape in accordance with such entries. So that such perforated tape may thereafter be used for controlling other types of business machines, in the manner well known to the art, the perforations are made successively and in known numeric coded combinations relative to selective channels along the length of the tape, as will hereinafter be described.

To effect such perforations upon the tape novel magnetic punch devices are provided, operable under control of the lister calculator. Said punch devices are constructed to form a compact unit, numbered 510 (FIG. 1) on the drawings, fast to the framing of the lister calculator, so that the whole forms a single machine enclosing all wiring and adapted to be easily handled for movement from one place to another. Also it is noted that in the geometry of linkages between the punch members and the electromagnetic means which actuate the punches a maximum of compactness is achieved together with a simplicity of manufacture.

In order to simplify the description, operations of the punch devices are described later in connection with a five channel tape. However, the punch unit 510 is constructed for use also in connection with well-known eight channel tape codes, and is therefore shown and described as embodying eight code punch members 511 (FIGS. 11–14).

Punch members 511 are slidably mounted in upper and lower guide plates 512—513, secured within the side plates 514—515 of the punch unit 510, and are adapted for co-operation with related holes 516 of a die plate 517, fast upon the top guide plate 512. Die plate 517 is suitably spaced above guide plate 512 to permit passage of the record tape 518 between said die and the punch members 511, and also between said die and a special punch member 519′ (FIG. 15) which is of smaller diameter than the punches 511. Punch 519′ is provided for the purpose of punching feed holes 519″ in tape 518, whereby said tape is adapted to engage the teeth of a sprocket wheel 520, operable intermittently for advancing tape 518, as will be described.

The lower portion of each punch member 511 and of punch 519′ is provided with a notched portion embracing a circular shaped forward end 521 of a related bell crank lever 522. Bell crank levers 522 are pivotally mounted upon a transverse rod 523, secured within the left and right side frame plates 514—515, and are made of flat stock each of which is spaced on rod 523, by means of suitable spacing washers, so as to be aligned with the respective punch members. The other arm of bell crank levers 522 is provided each with an open end slot 524 embracing a pin 525 mounted between spaced arms 526′ of related operating levers 526 for said bell cranks. Operating levers 526 are pinned in alignment with the related bell cranks 522 upon separate shafts 527, said shafts being arranged in a semicircular arc around the support rod 523 of the bell cranks 522.

Arranged also in a corresponding arc around rod 523 and being secured to the left side plate 514 of the punch unit is a group of five rotary type electromagnets or solenoids, one numbered 519, one 532, and three being numbered 528, the said solenoids being positioned in a coplanar and equally angularly spaced apart relation. To the right side plate 515 is similarly positioned a group of five solenoids 528′, so arranged that all the solenoids will be equally angularly spaced apart and each secured upon the left and right side plates 514—515 respectively in an alternate manner as shown in FIGS. 11–14.

Rotary solenoids 528—528′ are of well-known type and each have the armature 529 thereof fast to one end of the corresponding shaft 527, which shafts are supported within the related solenoids. Armature 529 is adapted when a solenoid is energized to impart both an axial and rotary movement to the respective shaft 527, in the manner as set forth in the U.S. Patent No. 2,473,598 issued June 1, 1949 to George H. Leland.

The other end of shafts 527 are slidably supported within the opposite side plates of the punch unit, each in alternate manner as shown in FIGS. 11–14.

With the above-described arrangement of the parts it is apparent therefore that such moments of inertia as are required in effecting an operation of any of the punch members will be of uniform character for all the punch members.

As previously stated, it is desired that in the instant case perforations are to be effected upon a five channel code tape, such as that illustrated in FIG. 16. Thus, to simplify the description, only the solenoids 528—528′ which are indicated by the numerals 1–5, and the feed hole solenoid 519 (FIG. 11), are included in the present circuit for operating a related punch member which will effect perforations along the correspondingly indicated channels of the tape 518 (FIG. 16). From the following description it will be obvious however that should it be desired to effect perforations within the well-known eight channel code tape the additional solenoids 528—528′, indicated by the numerals 6–8, would then be connected into the circuit devices so as to supplement the five channel code tape solenoids and would operate therewith, in similar manner to that as described hereinafter with relation to the five channel code tape devices.

A sprocket wheel 520 for advancing the tape 518 is caused to be rotated counterclockwise (FIGS. 13–15) in intermittent manner by means of a rotary solenoid 532 (FIG. 11) in the following manner.

Mounted forwardly of the operating shafts 527 is a similar shaft 527′ (FIGS. 13 and 15) biased for counterclockwise rotation through means of a spring tensioned arm 533 fast thereon. Secured also upon shaft 527′ is an arm 526″, similar to the arm 526, and having pin and slot connection 525′ with a lever 534, pivoted upon support rod 523 of bell cranks 522. The forward end of lever 534 has a tooth 534′ adapted in the normal raised position of said lever to engage with the teeth of sprocket wheel 520. Pivotally mounted at 535 upon the forward end of lever 534 is a yieldable pawl 536 held counterclockwise into engagement with sprocket 520 by suitable spring means 537. The left end of the shaft 527′ is fast with the armature of the related solenoid 532, as in the manner described for shafts 527 of solenoids 528—528′. Thus, energizing of solenoid 532, in the manner as hereinafter described, effects clockwise movement to shaft 527′ and to arm 526″ and through pin and slot connection 525′ will rock lever 534 downwardly about pivot rod 523. Downward movement of lever 534 will remove tooth 534′ from engagement with ratchet wheel 520, while at the same time feed pawl 536 is carried downwardly for engagement with a next succeeding tooth of ratchet wheel 520. Upon a subsequent release of solenoid 532 a spring 538 will act to restore the parts, whereupon pawl 536 will advance sprocket wheel 520 one tooth step of movement. During this movement tooth 534′ is again brought into engagement with the teeth of ratchet 520, to prevent any overthrow due to the rapid operation thereof and to stop the tape feed devices in precise position.

To assure of full and proper engagement of tape 518 with the teeth of sprocket wheel 520 the tape is fed between said wheel and a suitable guide member 539, fast to a shaft 540, pivotally supported within the end plates 514—515 of punch unit 510. Guide 539 is held against tape 518 by means of a suitable spring tensioned arm 541 (FIGS. 12 and 14) also fast to shaft 540, and in order to facilitate an entry of the tape the guide 539 is manually raised and latched in raised position by adjustment of a thumb knob 542. Adjustment of knob 542 acts, by rotating latch arm 543 for engagement with arm 541, to rotate the shaft 540 of guide 539 and to subsequently position the surface 543′ of said latch forward of the arm 541.

In the event that tape 518 should run out or become broken, or at such times as guide 539 is held in raised position, the following means will act to disable operation of the punch devices.

Loosely mounted upon the shaft 540 of guide 539 is a bail 544 (FIG. 13) which extends beneath a shoulder 545 formed on the pivot arm of guide 539. Bail 544 has a rearwardly extending arm 546 provided with a lateral projection 546′ (FIG. 15) extending over the tape 518. Upon operation of knob 542 to raise guide 539 to open position the shoulder 545 will rock bail 544 counterclockwise thus lifting projection 546′ above the surface of plate 547 of the punch unit so that the tape 518 may be passed beneath said projection. Upon subsequent restoral of guide 539, through release of latch 543, bail 544, under influence of a suitable spring moves downwardly until stopped by engagement of the projection 546′ with the upper surface of tape 518. The rearward surface of arm 546 has formed thereon a cam projection 548 which is adapted when arm 546 is at rest upon the tape 518 to hold in rearward position an arm 549 controlling a snap switch 550 in the master circuit to the punch control devices, as described later in connection with the wiring diagram shown in FIG. 17. In rearward position shown in FIG. 13 arm 549 effects closure of switch 550 for extending the circuit. Displacement of arm 546 upwardly as described, or downwardly by a tape failure due to either a breakage or running out of tape 518, will displace projection 548 and release arm 549, so that snap switch 550 is immediately opened to break the circuit means and thereby disable the punch devices.

*Encoding and readout devices*

Figure 8:
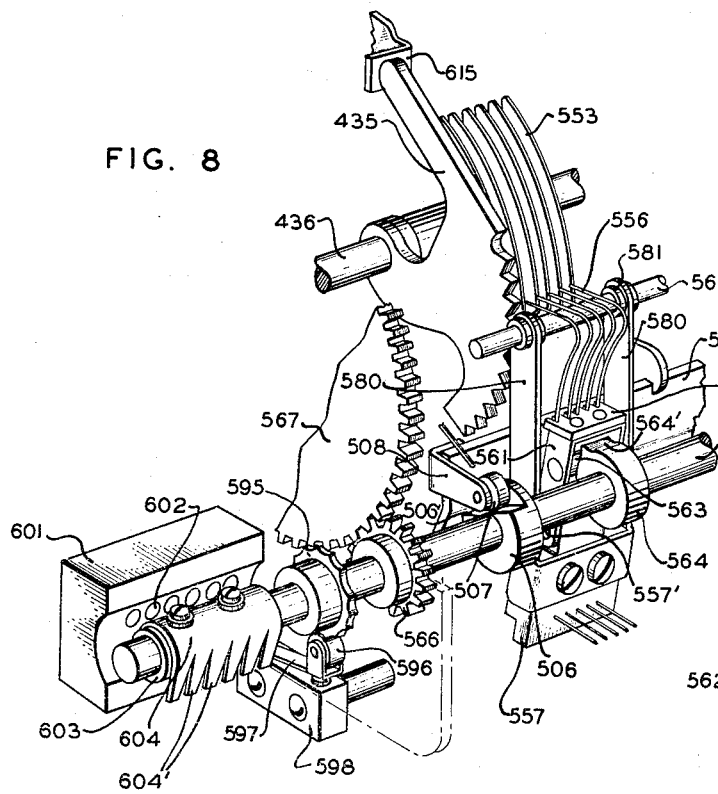
FIG. 8 is a fragmentary left-hand perspective view of the encoding and sequential readout devices.
Figure 10:
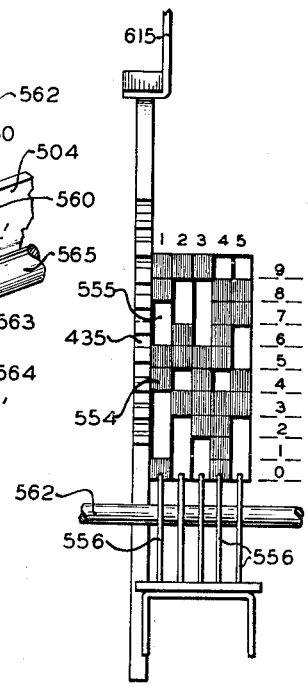
FIG. 10 is a diagrammatic representation of one of the encoding units.
Figure 9:
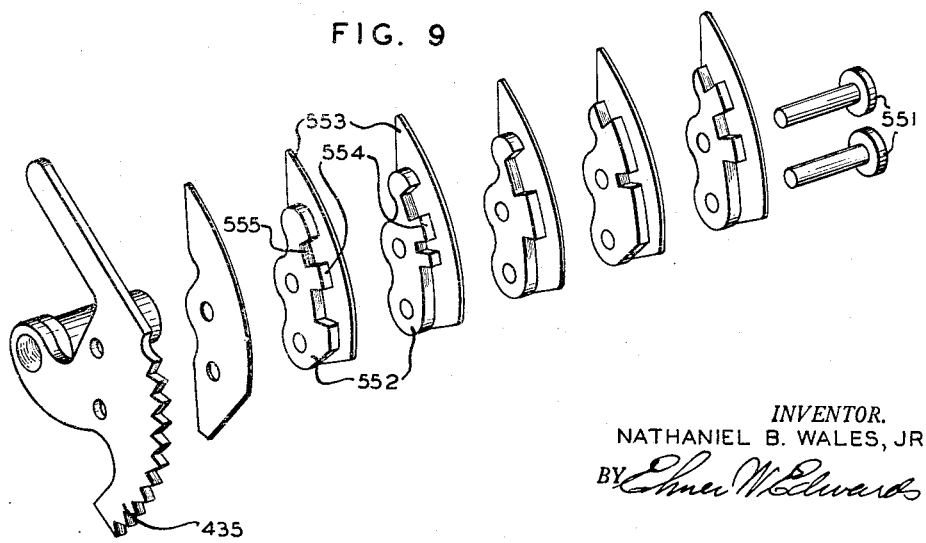
FIG. 9 is a detail left-hand perspective view showing one of the encoding units.
Figure 11:
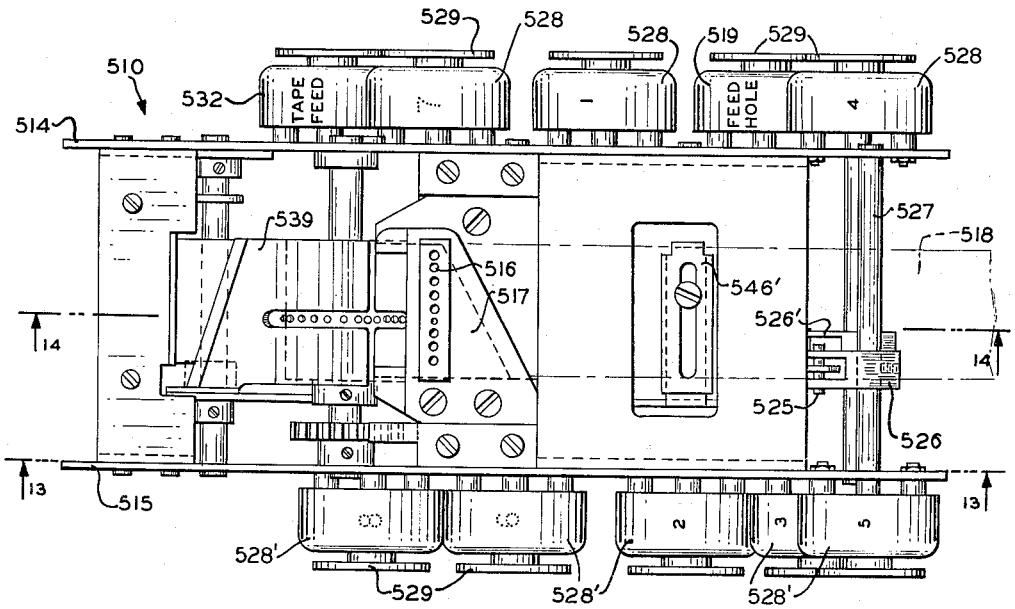
FIG. 11 is a top plan view of the punch unit.
Figure 12:
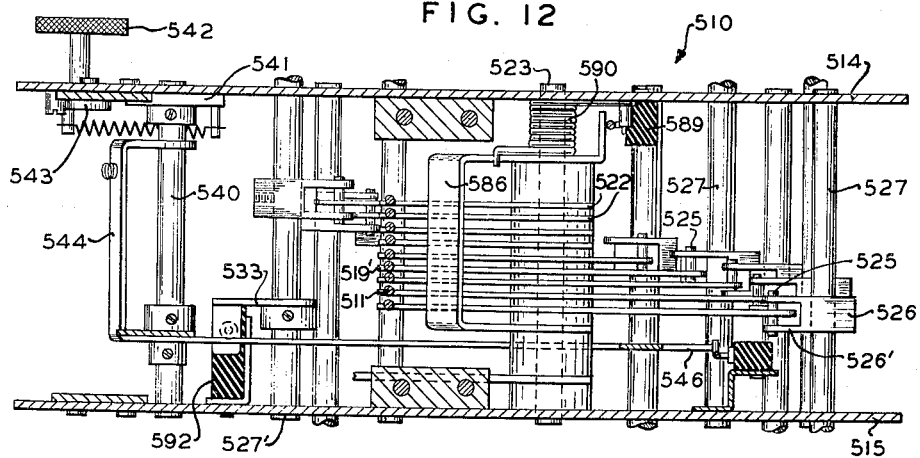
FIG. 12 is a sectional plan view of the punch unit, along line 12—12 of FIG. 13.

To control selective operations of the punch solenoids 528—528′ and effect thereby coded perforations along selective channels of the five channel tape 518, in accordance with digit values of the decimal system entered through the keyboard devices of the lister calculator, novel encoding elements are provided as follows:

With reference to FIGS. 8–10, it will be recalled that for each denominational order of actuator racks 610 and associated index bar 615 there is provided a stop segment 435 and that said stops are adjusted in a forward movement of its related bar 615 in accordance with the digit value displacement of said bars.

Secured, through means of suitable studs 551, to the right side face of each stop segment 435 is a group of five plates 552 of dielectric material, each plate of the group being spaced from the adjacent plate by means of guide separators 553, also being constructed of dielectric material. The outer peripheral diameter of said plates form a plurality of lands 554 of uniform radius from the pivot shaft 436. The peripheral diameter of said plates have also formed thereon a plurality of depressed surfaces 555 all of uniform shortened radius to the shaft 436 than the radius of lands 554. The plates 552 each have relation to a corresponding channel of the tape media 518, as indicated by the numerals 1–5, reading from left to right, of FIGS. 10 and 16. The shorter diameter surfaces 555 of plates 552 are arranged to form coded combinations representative of digit values 1 to 9 and 0, as said plates are displaced relative to a group of related sensing fingers 556. There being a group of sensing fingers 556 mounted as a unit within suitable insulation blocks 557 related to each denominational order of the machine.

Sensing fingers 556 are adapted, as hereinafter described, to selectively extend electrical circuit to the punch solenoids 528—528′ and it has been found preferable that these fingers be constructed of spring tempered phosphor bronze wire and clad with silver.

The lower portion of fingers 556 extend through suitable grooves cut in the rear surface of insulation blocks 557, and then bend forwardly to project through suitable orifices of said blocks so that circuit leads may be attached thereto. Blocks 557 are each secured to a common cross frame 558 (FIG. 2) of the machine, and a suitable insulation strip 559 spaced between said plate and the blocks 557 acts to secure each of the fingers tightly within the grooves of said blocks. Each group of fingers 556 extend upwardly of their respective blocks 557 and pass through suitable grooves cut within an insulation plate 560 fast to a bail 561 supported for pivotal movement upon suitable trunnions 557′, formed as a part of each block 557. The upper portion of fingers 556 are offset forwardly of a transverse rod 562 and are bent thereafter to project rearwardly, between guide separators 553, to a point slightly forward of the larger peripheral diameter represented by the lands 554 of encoding plates 552.

Mounted within each of bails 561 is a roller 563 held, through means of spring tension exerted by fingers 556, against the concentric diameter portion of a related cam member 564, fast to a transverse shaft 565, bearinged in the side framing of the machine. Cam members 564 are provided each with a cam tooth 564′, said teeth being progressively arranged around shaft 565 in helical manner, so that in an operation of shaft 565 the teeth 564′ will act to impart a clockwise movement to each of the bails 561 in successive manner from left to right, and the plates 560 thereof in turn move each of the group of related sensing fingers 556 rearwardly.

As shown in FIGS. 7 and 8, secured upon shaft 565, near the left end thereof, is a pinion gear 566 having connection through reduction gear train 567 with a similar pinion gear 568, fast to the driven side of a clutch member 569, the drive side of said clutch having suitable gearing connection 570 to motor shaft 571. The cam shaft 565 is operated one complete rotation for each two rotations of clutch means 569.

It will be recalled that at the end of a forward cycle of operation and after adjustment of stops 435 by bars 615 in accordance with the digit values set up on keys 215, a cyclic arm 318′ (FIG. 5) rocks the bell crank member 500 to adjust locking bail 504 into engagement with the stop members 435, and stops 435, with the coding elements 552 thereon, are thereafter held in a set position until a tripping of the latch member 445 at the end of a return movement of arm 318′ releases bail 504 from said stops.

Pinned to the shaft 502 (FIG. 7) of bell crank 500 is a rearwardly extending arm 572 held normally in raised position by spring 572′ and having pivotally mounted thereon at 573 a pawl 574. The lower edge of pawl 574 in operations not requiring that a perforated record be made upon tape means 518 is held free of a lug 576 on the rearward end of a clutch control lever 577 for the clutch means 569, as illustrated in FIG. 7. An upper arm of pawl 574 has engagement with a pin 635 fast within the lower arm of a bell crank lever 633, fulcrumed to the framing at 634 and having pin and slot connection 632 with an arm 631 fast to the shaft 630 of a rotary solenoid 629. Suitable spring means within solenoid 629 holds shaft 630 and arm 631 in counterclockwise position when said solenoid is in deenergized condition, the said spring being of sufficient strength to hold pawl 574 counterclockwise of lug 576 against tension of spring 575.

Thus for any operations in which the lister calculator is to be used without effecting perforated records upon the tape means 518 an operation of arm 572 at the end of a forward stroke of the machine cycle of operation will merely carry pawl 574 downwardly without engagement thereof with lug 576 and no operation of clutch means 569 is effected. For operations in which a perforated record upon tape 518 is to be made, however, pawl 574 is first caused to be rocked in a clockwise direction to overlie lug 576, by an energizing of the solenoid 629, and thereafter a downward movement of pawl 574 will act to rock clutch lever 577 about point 578 and release clutch means 569 of the tape perforating devices into operation. Solenoid 629 is connected to negative circuit lead 583 (FIG. 17) through a normally closed switch means 477. The plus side of said solenoid has connection to plus lead 593 which is, however, broken by a normally open switch means 636. Switch 636 (FIG. 1) constitutes a manual on-and-off means for the energizing or deenergizing of solenoid 629 so that the machine may be selectively conditioned for either an operation or nonoperation of the tape perforating devices. Thus in operations not involving a tape perforating record the lister calculator is free to operate at normal speeds, without any delay required to permit operations of the readout and punching means.

For operations in which a record is to be punched in the tape 518, therefore, the clutch 569 will be tripped for an operation, concurrently with a return stroke of the cyclic devices of the lister calculator, and will start operation of cam shaft 565 in a counterclockwise direction, as viewed in FIGS. 7 and 8. During such operation of shaft 565 the cam members 564 thereon will act to impart a rearward movement in successive manner to the sensing units, from the higher to lower denominational orders.

It will be recalled that at the end of an operation of the cyclic devices of the lister calculator the locking bail 504 is released from engagement with stops 435, while clutch lever 106 (FIG. 3) is also caused to be restored and will normalize the motor switch 110. Such machine cycle of operation, however, is completed prior to a completion of the operation of cam shaft 565 by the clutch means 569 above-described and the following means are provided therefore to maintain locking bail 504 in engagement with stops 435 until the completion of an operation of cam shaft 565. Secured to shaft 565 is a cam disc 506 (FIG.

8) cooperable with a roller 507 fast to an arm 508 of locking bail 504. During the above-described operation of shaft 565 the concentric surface of cam disc 506 is rotated opposite the roller 507 and acts to maintain bail 504 in rocked position. Near the end of the rotation of said shaft, however, a cutaway portion 506' of disc 506 is caused to be brought opposite the said roller and will thereby permit release of the bail 504 from the stops 435.

So that the electric motor will be maintained in operation following the restoral of the switch 110 a snap switch 509 (FIG. 5) is placed in parallel circuit with motor switch 110. Switch 509 is normally held in open circuit condition, by engagement of bail 504 with the pivoted arm 509' of said switch, when said bail is in normal position out of engagement with the stops 435. Upon operation of bail 504 for engagement with stops 435 however said bail releases arm 509' to effect closure of switch 509 and will maintain motor operation until bail 504 is caused to be restored by the above-described cam means 506.

In the above-described operation of locking bail 504 the arm 572 (FIG. 7) and pawl 574 are locked in depressed position and clutch lever 577 is held thereby in operated condition until near the end of a second cycle of operation of clutch member 569 when a release of bail 504 by cam 506 permits restoral of lever 572 by spring 572' and thus releases clutch lever 577 for reengagement with clutch 569, to thereby terminate an operation of the tape perforating devices.

As each order of the sensing units are rocked rearwardly the sensing fingers 556 thereof move toward the related encoding plates 552 of the corresponding order. Thus any of the fingers wherein a lower surface 555 of the plates 552 have been positioned opposite thereto in the displacement of the related stops 435 are permitted to move a full step of movement, while any of such fingers wherein lands 554 of said plates stand opposite will be prevented against substantial movement. Thus, as illustrated in FIG. 10, certain combinations of fingers 556 are permitted to move rearwardly and effect a coded representation of the digit values 1 to 9 and 0, as in accordance with the unshaded portions of said figure.

While such a coded representation of the digit values may be utilized in various mechanical ways, such as for controlling of punch selection means by the well-known use of Bowden cables, the present invention employs simple devices for converting said representations into corresponding coded electrical circuits, to be described in connection with the wiring diagram shown in FIG. 17.

In order to more clearly follow the sequence of operations and the circuit means employed, an entry of $45.00 will be set up on the digit keys 215 and thereafter entered in an additive operation upon the register devices of the lister calculator.

The amount $45.00 having been set up on keys 215, a depression of plus bar 114 (FIG. 3) trips the cyclic devices of the machine, while also depressing the related bail 49 to effect an additive operation of the control slide 74, as in the manner earlier set forth. Beneath each of the bails 49 related to the operation control keys of the machine is a snap switch 579, as shown in FIG. 5 and illustrated in the wiring diagram of FIG. 17. Depression of plus key 114 acts also therefore to close the related snap switch 579, for the purpose hereinafter to be described.

During the forward cycle of machine operation the active index bars 615 of the thousands and hundreds order will act to adjust the respective stops 435 to the digit value positions 4 and 5 respectively and at the end of the forward stroke bail 504, through bell crank 500 operated by cyclic arm 318', is moved into engagement with stops 435, locking said stops in set position. At this time bell crank 500 acts also to trip the single cycle clutch 569 (FIG. 7) for effecting operation of cam shaft 565. Upon operation of cam shaft 565 the extreme left cam member 564 (FIG. 8) will immediately act to displace the higher order sensing unit 557 rearwardly. The stop member 435 corresponding to this order has remained at the normal or zero position and the sensing fingers 556 of this order related to the numbers one and four coding plates 552 (see also FIG. 10) are prevented from moving while fingers 556 related to the numbers two, three and five plates are rocked rearwardly into engagement with the contact bar 562, common to all of the fingers 556.

Contact bar 562 extends transversely of the fingers 556 and is supported upon suitable brackets 580 which are insulated from said bar by means of insulation collars 581. Contact bar 562 is connected by means of leads 582—583 (FIG. 17) to the negative side of a power rectifier 584. The lower end of each sensing finger 556 has a circuit lead connection 585 to the corresponding punch solenoid 528—528' which is adapted to effect a perforation in the related channel of the tape means 518. The plus side of solenoids 528—528' are connected by means of a common lead 591 to a normally closed contact switch 592 and thence through circuit lead 593 to the plus side of power supply 584. Thus, in the above-described operation, upon engagement of the numbers two, three and five fingers 556 with the contract bar 562 circuit is established to the corresponding solenoids 528—528' and said solenoids are caused to be energized simultaneously to rock their respective bell cranks 522 (FIG. 13) for effecting simultaneous operation of the related punch members 511, which perforate the second, third and fifth channels of the tape 518 for a coded representation of zero.

Figure 13:
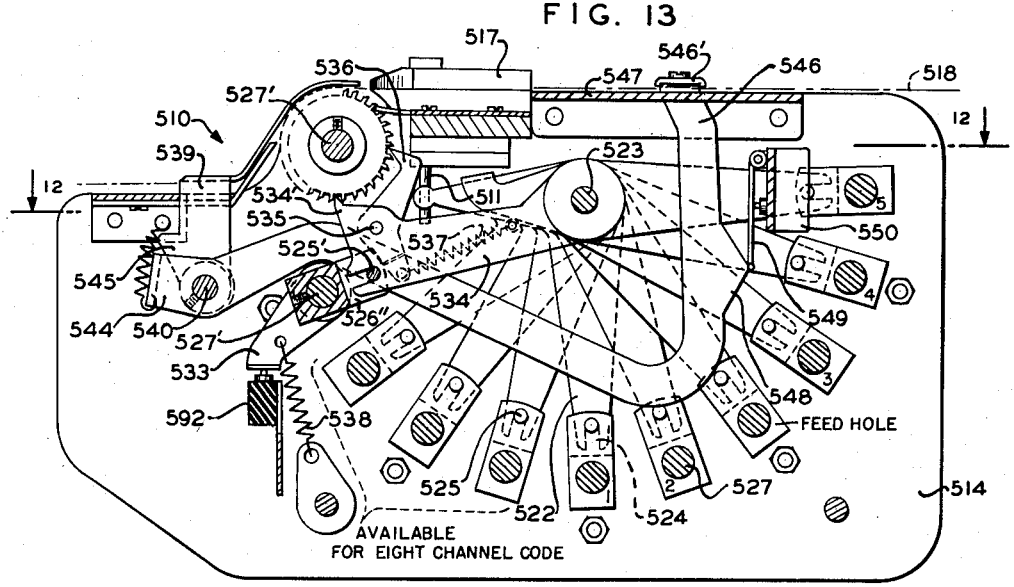
FIG. 13 is a right-hand sectional elevation of the punch unit taken on line 13—13 of FIG. 11.
Figure 14:
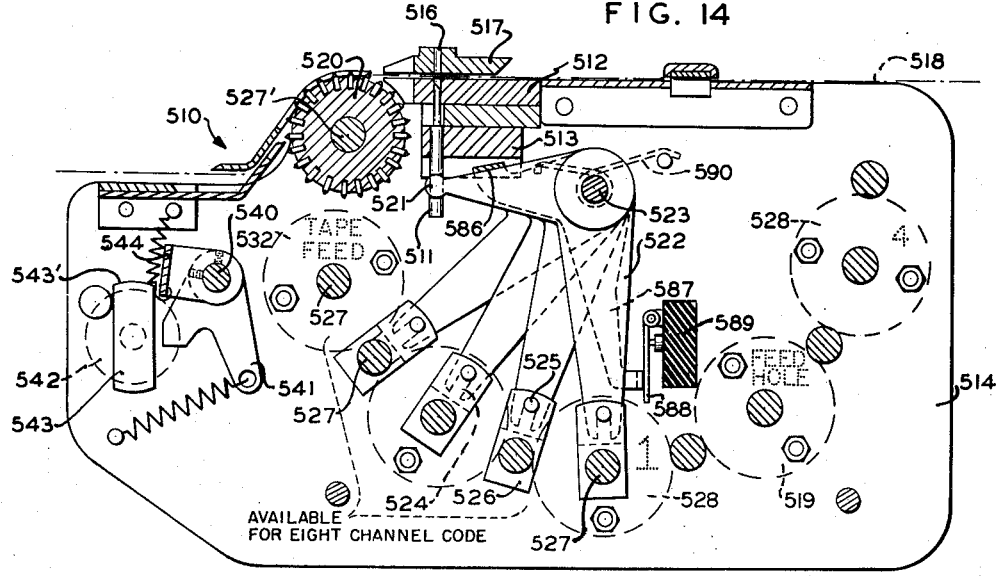
FIG. 14 is a right-hand sectional elevation of the punch unit taken on line 14—14 of FIG. 11.

In the above illustration it is assumed the tape 518 is properly inserted and therefore tape failure switch 550, earlier described in connection with FIG. 13, is in closed position, so that circuit is established from power source to the rectifier means 584.

Pivotally mounted upon transverse rod 523 is a bail 586 (FIG. 14), which extends across the top surface of bell crank members 522 and has a downwardly extending arm 587 engaging the pivoted arm 588 of a snap switch 589. Bail 586 is biased by a suitable coil spring 590 in a counterclockwise direction and serves to hold switch 589 normally in open circuit condition.

Immediately upon operation of any of the bell cranks 522 in effecting a punching operation, however, bail 586 is caused to be rocked clockwise, thereby releasing arm 588 and effecting a closing of the switch 589. One side of switch 589 has circuit lead 594 to the negative lead 583 and upon said closure extends negative circuit to the feed hole punch solenoid 519, and the plus terminal of said solenoid being connected through lead 591 and normally closed switch 592 to the plus terminal lead 593 said solenoid is also energized at this time to effect operation of the feed hole punch 519' (FIG. 15).

Fast upon cam shaft 565 (FIG. 8) is a pulsing cam 595, adapted for engagement with a roller 596 fast to the pivoted arm 597 of a normally open switch 598, secured to the left side framing of the machine. As shown in FIG. 17, one terminal of switch 598 has connection to negative power source, through lead 599, rod 562 and leads 582—583. Following sufficient time to permit the punch solenoids to complete their upward stroke and effect a perforation of tape 518 the pulsing cam 595 acts to close switch 598 and thereby extend ground circuit, by means of lead 600, to energize the tape advance solenoid 532 (see FIG. 11). Immediately upon an operation of the tape advance solenoid 532, the advance pawl 536 (FIG. 13) is cocked preparatory to advancing the tape, while the arm 533 releases switch 592 and thus opens the common plus circuit 591 to the punch solenoids. At this time the cam 564 (FIG. 8) releases the sensing fingers 556 from engagement with rod 562, and the plus circuit to the punch solenoids having been broken, as described, any arcing that might otherwise occur at this time between the sensing fingers and rod 562 is thereby eliminated.

From the above description relative to the highest denominational order it will be obvious, that as cam shaft 565 continues to rotate, the cams 564 to the right will act successively to engage each related order group of sensing fingers 556 with the contact bar 562 and effect operations of selective punch solenoids 528—528' in accordance with a displacement of said fingers as controlled by the encoding plates 552, which plates are displaceable in accordance with digit values of the decimal system. It will be obvious, also, that during each of said operations the active punch solenoids will effect operation of switch 589 to cause an operation of feed hole magnet 519 and that just prior to a release of each order sensing unit by its related cam 564 the pulsing cam 595 will act each time to cause an operation of the tape advance means, as in the manner above-described. Also operation of the tape advance means each time in turn opens switch 592 for deenergizing all the punch magnets, following which the active cam 564 releases the related sensing fingers each time to their normal position away from contact rod 562.

In the illustrated example therefore the numbers two, three and five sensing fingers 556 for each denominational order to the left of the highest order significant digit value are caused to be moved into engagement with rod 562 each time and thereby effect operation of related punch solenoids 528—528' for perforating corresponding channels two, three and five of tape 518 indicating a coded representation of zero. In the thousands denominational order the stop 435 has been displaced to the digit four value position and the numbers two and four sensing fingers 556 only are now permitted to move into engagement with rod 562. For the hundreds denominational position the number five finger only, corresponding to the digit value five, will be permitted to move into engagement with rod 562. Thus for the thousands denominational order a negative circuit is caused to be extended from rod 562 and through the active sensing fingers 556 and leads 585 to the related numbers two and four punch solenoids, thereby effecting perforations in channels two and four of tape 518. Thereafter for the hundreds column a circuit is established in like manner to the number five punch solenoid for effecting a perforation of tape 518 relative to channel five only.

Again, as for zeros to the left of the significant digit values, in the tens and units order the sensing fingers 556 controlling the numbers two, three and five channel punch solenoids 528—528' only are permitted to engage rod 562 for controlling zero coded perforations upon the tape.

After the completion of a punching operation with respect to the units denominational order, shaft 565 will continue to rotate and a coding commutator switch 601 is caused to be operated thereby. Switch 601 controls selective operation of the punch solenoids 528—528' for effecting identifying perforations upon tape 518 in accordance with selective operation of the various operating control keys, as will now be described.

Commutator switch 601 comprises an insulation block, secured to the left-hand frame of the machine, and having mounted therein three rows of six contact pins 602 for each row, extending parallel to the cam shaft 595. Thus, looked at in another way, the parallel rows of pins form six columns of three pins, each column arranged in an arc around the cam shaft 565. Fast upon shaft 565 near the left end, and insulated from said shaft by means of a suitable insulation collar 603, is a comb sleeve 604 having a plurality of contact arms 604'. There are six contact arms 604' each arm related to one of the group of three contact pins 602. During a continued rotation of shaft 565, following the completion of a numerical read-out, arms 604' are each wiped over the related three pins in successive manner.

The three pins 602 of the right-hand column are connected each to negative source, through common lead 605, lead 599, rod 562 and leads 582, 583 to the rectifier means 584. Thus as the coding comb 604 is rotated with shaft 565 the end contact arm 604' engaging with end pins 602 serves to extend negative circuit to the comb sleeve 604. In the top row of pins 602 the pin in the third column to the left has connection, through lead 606, a normally closed switch 607, lead 609 and related lead 585, to the number three punch magnet. Engagement of contact arm 604' with this pin will therefore extend negative circuit to energize said magnet and effect a perforation within the third channel of tape 518.

As the shaft 565 continues its rotation comb 604 thereafter bridges right-hand contact pin 602 of the middle row of pins with both the third and the fourth column of pins 602 of said row.

It is recalled that the depression of a function control key (non-add, minus, plus, subtotal or total) will depress its related bail 49 (FIG. 5) and effect an operation of a corresponding snap switch 579. With the exception of the switch related to the total key each of the switches 579 has connection by means of a common circuit lead 619 with the pin 602 of the third column of the middle row, as shown in FIG. 17. The other terminal of switches 579 for the non-add, minus, plus and subtotal keys are connected, through respective leads 585, to the number four, one, three and five punch solenoids 528 respectively. Thus upon depression of an operating control key, with consequent closure of the related switch 579, a circuit is extended from the third left column pin 602 of the middle row to a selected magnet 528 in accordance with the particular operating key depressed.

In the present example an operation of the plus bar 114 will have therefore extended circuit to the number three solenoid, and as comb 604 bridges the end pins 602 with the third column pin 602 of the middle row, as above-described, negative circuit is extended thereby to the number three punch magnet. The fourth left column pin 602 of the middle row having also been bridged by comb sleeve 604, as described, circuit is established at this time to the number two punch magnet, through leads 612, 585' and 585, so that a perforation is effected simultaneously in both the second and third channels of tape 518.

In the bottom row of contact pins 602 three of said pins at the extreme left are connected each by circuit leads 621, 622 and 623 respectively to one side of a group of related and normally open switches 624, 625 and 626, forming part of the total relay devices to be hereinafter described. The third left pin of the bottom row, however, has circuit connection 627 to a normally closed switch 628 of said relay devices and as comb sleeve 604 is rotated to bridge pins 602 of the bottom row of pins negative circuit is established from said fourth pin, through lead 627, closed switch 628, lead 609, and the lead 585 for energizing the number three punch magnet, which effects again a perforation in the third channel of tape 518.

It is recalled that each operation of punch magnets 528 effects an operation of the switch 589 (FIGS. 14 and 17) for the feed hole magnet 519 (FIG. 11) and also that pulsing cam 595, operating with shaft 565, effects operation of switch 598 (see also FIG. 8) for the tape advance magnet 532.

During the above-described series of operations a closure of switch 589 each time extends negative circuit from leads 583, 594 to the negative side of the feed hole solenoid 519. The positive side of solenoid 519 is connected through lead 591 and normally closed switch 592 to plus terminal lead 593. Therefore, in each of the above operations of punch solenoids 528 the feed hole solenoid 519 is also operated.

As in the manner earlier described, after a sufficient time to permit the active punch solenoids to complete an upward stroke of their respective punch members in each operation the pulsing cam 595 acts to close circuit switch 598 and will energize the tape advance solenoid 532 to advance the tape 518. Operations of solenoid 532 also causes arm 533 (FIG. 13) each time to release the normally closed switch 592 and thereby open plus circuit side of punch solenoids 528, 519 for deenergizing said solenoids. A deenergizing of the active punch solenoids thereupon permits arm 587 to release contact switch 589 to open condition and thereby break the negative circuit lead 597 to feed hole solenoid 519, all as in the manner earlier set forth. Operation of switch 598 to open position by pulsing cam 595 is timed to occur prior to a release of contact arms 604' from the active pins 602, so that no arcing takes place during said release, and said cam thereafter effects reengagement of switch 598 just prior to a reengagement of contact arms 604' with a next set of active pins 602.

Thus for a coded identification of a plus operation there would be effected three successive punching operations, together with tape advancement; first, a single perforation in channel three, second, perforations simultaneously in channels two and three, and third, a single perforation in channel three.

In normal totalizing operations, following a depression of the total key 278 the stops 435 are displaced in accordance with the numerical values accumulated within the accumulator wheels 472. The sensing devices then act to read out such amounts as translated by the encoding elements 552 and will control an operation of the punch devices for effecting coded perforations along selected channels of the tape means 518, all as in the manner fully set forth above in connection with a keyboard entry control of said devices.

Upon depression of total key 278 the switch 579 related to said key is operated to close ground, from circuit lead 638 and through lead 639, to the total relay member 640. Plus side of relay member 640 is directly connected to power rectifier 584, through leads 641 and 593, so that upon operation of total key switch 579 relay 640 will become energized and effect operation of the gang switch members 624, 625, 626, 628 and 607 previously described. The switch members 624, 625 and 626 comprise normally open single pole contact means each having one side connected to the related number five, four and two punch magnets respectively through leads 585—585'. The other side of switches 624—626 are connected, as previously set forth, through means of leads 621—623 to the three left-hand pins of the bottom row of pins 602. Switches 628 and 607 of the group are double pole switches normally closed to the contacts of one side which is connected each by common lead 609 to lead 585 for the number three magnet. The central or control arm of switch 628 has connection, by means of lead 627, to the third pin from the left in the bottom row of pins 602, while the control arm of switch 607 is connected through circuit lead 606 to the third left pin in the top row of pins 602. The normally open right-hand pole of switch 628 is connected by means of circuit lead 585—585' to the number one punch magnet 528, while the normally open right-hand side of switch 607 is similarly connected to the number four punch magnet. Thus for a total taking identifying perforation upon the tape means 518 the coding comb 604 engages the top row of pins to first close negative circuit from power rectifier 584, through leads 583, 582, bar 562, lead 599, right-hand pin 602 of the top row, comb 604 and the third pin to the left in the top row of pins 602 to the control arm of switch 607. Upon the above-described operation of relay 640 switch 607 is caused to be opened relative to the number three magnet 528 and is closed relative to the number four punch magnet so that said solenoid is energized at this time to effect a perforation in channel four of the tape 518. Thereafter engagement of coding comb 604 with the fourth pin to the left in the middle row of pins 602 will extend negative circuit from said pin, through leads 612, 620 and 585, to the number two solenoid 528 for effecting a perforation in channel two of tape 518 in the next succeeding space line. Upon a subsequent movement of coding comb 604 to engage the bottom row of pins 602 a negative circuit is then caused to be extended from the four left-hand pins 602 of said row to one terminal of the related switch members 624, 625, 626 and 628 respectively, and thence, by virtue of the above operation of said switches by total relay 640, to the corresponding numbers five, four, two and one punch solenoids 528. Therefore, perforations will be effected simultaneously in the corresponding channels five, four, two and one in the subsequent advanced position of the tape 518. Throughout the above series of coded total identifying perforating operations the feed hole magnet 519 is caused to be operated each time in conjunction with an operation of punch magnets 528, also tape advance solenoid 532 is operated in timed relation therewith by means of impulse cam and switch means 595, 598, the operation of solenoid 532 serving to release switch 592 and deenergize all the punch magnets, as in the manner earlier set forth.

*Punch control in negative total operations*

As previously described overdraft devices are provided which require three machine cycles of operation to effect the printing of a complemental total as a true negative total value. Special means, as will now be described, are provided therefore to disable operations of the readout and tape perforating means until after a complemental total has been converted to a true negative value upon the accumulator wheels. With reference to FIG. 5, it will be recalled that in an overdraft totalizing operation the higher order actuator rack 610 in moving from eight to nine registering position acts to release a lever 418 for counterclockwise movement and thus effect operation of the overdraft control devices. Upon counterclockwise movement of arm 418 a cross member 418' thereof is moved rearwardly away from the projection 474' of a bail 474, fulcrumed upon transverse shaft 432, whereupon said bail will be rocked in a clockwise direction by means of a suitable spring 475.

Secured to a bottom cross framing of the machine, by means of bracket 476, is a switch 477 the contact members of which are normally in a closed condition, as illustrated by the wiring diagram in FIG. 17. A negative circuit extends from power rectifier 584, through lead 583, normally closed switch 477 and lead 478 to one side of the solenoid 629 (FIG. 7) adapted for effecting control of operations of the cyclic clutch means 569 for the punch readout devices.

It will be recalled that to condition the machine for tape punching operations a master switch 636 in the plus circuit to solenoid 629 is first manually operated and has thus energized said solenoid, and thereby positioned pawl 574 over the lug 576 of release lever 577 for clutch 569.

Upon a clockwise operation of bail 474 (FIG. 5) in an operation of the negative total control lever 418, however, the forward edge of said bail is adapted to effect an operation of switch 477 and open the normally closed contact members thereof and thereby deenergize the solenoid 629. Shaft 630 of solenoid 629, as earlier described, is biased for counterclockwise rotation by a suitable spring (not shown) within said solenoid of greater strength than the spring 575 of pawl 574. Therefore upon said deenergizing of solenoid 629 shaft 630 and arm 631 fast thereto are released from the control of said solenoid and will be rocked in a counterclockwise direction. Upon counterclockwise operation of arm 631 bell crank lever 633 is rocked clockwise and pin 635 therein engages pawl 574 and rocks said pawl out of cooperation with the lug 576 of clutch lever 577. Thus an operation of the readout devices and punch means are rendered inoperative, and will remain so during the first two machine cycles of operation relative to a negative total taking operation. In a return stroke of the second cycle of operation, however, the following means will act to again reenergize solenoid 629 and restore pawl 574 to active position above lug 576. So that, in a third cycle of operation incident to a negative total taking operation the readout and tape punch means will be caused to be operated and will effect perforations upon selected channels of the tape 518, in accordance with the coded representation of the true negative total, taken from the accumulator wheels, as in the manner described for normal totalizing operations.

As earlier described with reference to FIG. 6, secured to the shaft 417 of the negative total devices is a cam member 463, which is rotated one-quarter turn counter-clockwise upon each indexing operation of shaft 417. Pivotally mounted at 460 to the right side frame of the machine is a downwardly extending lever 459, held normally in clockwise position against the tension of spring 462 by engagement with the highest peripheral diameter of the cam member 463. Secured to the right-hand frame of the machine is a normally open switch 480 one terminal of which has connection by means of lead 478 (FIG. 17) to the solenoid 629. The other terminal of switch 480 is connected to a power rectifier 584 through circuit lead 583. During an indexing of shaft 417 in the return strokes of a cycle of operation for the negative total sequence of operations cam 463 will be rotated and present the lower peripheral diameter thereof opposite lever 459 at the end of the second cycle. At this time lever 459 is rocked counterclockwise by spring 462 and a yieldable arm 459' thereof will engage a pivoted arm 481 of switch 480, rocking said arm to effect closure of switch 480. Closure of switch 480 establishes negative circuit to solenoid 629 to reenergize said solenoid and thereby recondition pawl 574 to its active position above lug 576. Thus pawl 574 is set to effect an operation of clutch means 569, in a subsequent operation of lever 572 by the bell crank 500 during the third cycle of overdraft operation.

Figure 3:
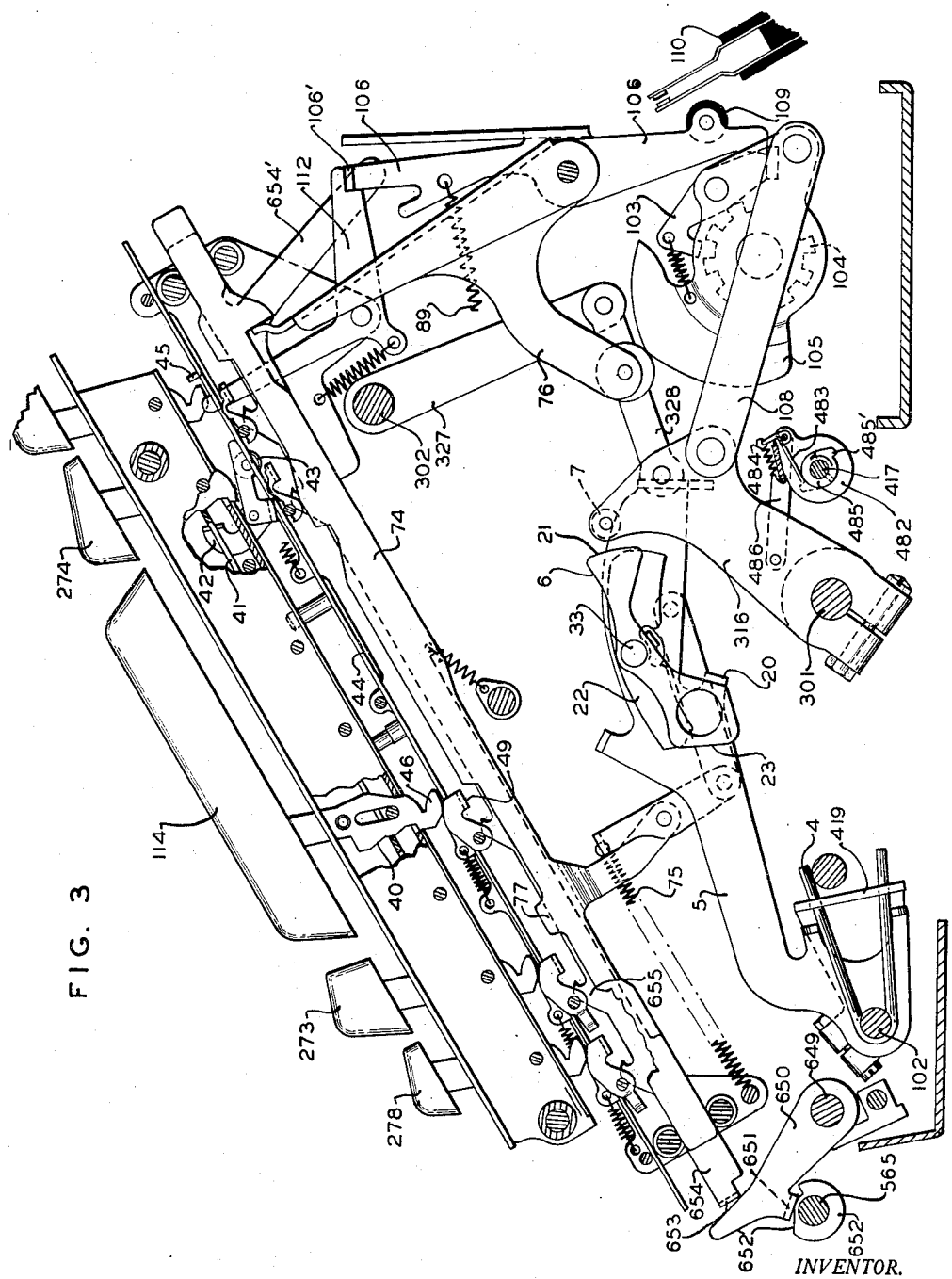
FIG. 3 is a right-hand elevation of parts just inside the right-hand frame including the operating keys, the operations conrol slide and parts operated thereby.

Referring to FIG. 3, it will be recalled that in a forward stroke of the third cycle for a negative total operation the pawl 483 engages tooth 485' and will index the shaft 417. Thus cam 463 (FIG. 6) rotating at this time would act to impart a clockwise movement to lever 459 and unless other means are provided such a movement would open the switch 480 and deenergize solenoid 629. This would act to release pawl 574 away from lug 576 before arm 437 is caused to be rocked downwardly, near the end of the forward stroke of the third cycle. Under such a condition a readout and tape perforating operation would fail to occur for the negative total operation. It will be recalled, however, that arm 459' at the end of a second cycle of overdraft operation is positioned by cam 463 above the projection 465 (FIG. 4) of control slide 81. Upon a forward movement of slide 81 at the start of the third cycle of operation projection 465 moves under lug 464 and will thereby prevent the downward movement of arm 459 and will thus delay opening of switch 480, until a restoral of slide 81 near the end of the return movement of the third cycle of operation acts to release said arm. Yieldable spring means 461 between lever 459 and arm 459' thereof permits cam 463 to rock lever 459 while arm 459' is held by projection 465.

In a return stroke of the third cycle of operation the regular indexing means 428 (FIG. 2) will index shaft 417 a final quarter of rotation, during which operation cam means 487 (FIG. 18) engages roller 488 for rocking lever 431, and a projection 431" engaging with the cross member 418' will thereupon restore lever 418 to normal latched position. Upon restoral of lever 418 bail 474 restores the switch member 477 to again close the circuit means to solenoid 629, so that at the end of the cycle the pin 446 (FIG. 5) in releasing latch 445 will permit spring 572' (FIG. 7) to restore arm 572, and pawl 574 is again positioned above lug 576, as the negative total operation is completed.

*Punch control in negative subtotal operations*

As in the well-known Monroe adding-listing calculator, which employs an improved embodiment of the devices of U.S. Patent #2,050,302, negative subtotal operations are performed by first zeroising the accumulator wheels and transferring the complemental value registered thereon into the stops 435 during the first machine cycle of operation, then subtracting the complemental value from the cleared accumulator wheels during a a second machine cycle leaving the wheels with a true credit balance registered thereon, a second totalizing operation then again clears the wheels and transfers the true credit balance value to the stops 435 during the third machine cycle of operation, and a fourth machine cycle of operation thereafter prints the true negative total value and subtracts said value from the cleared wheels, leaving the wheels with the complement of the true negative total value again registered thereon. Thus, for a negative subtotal operation in which four cycles of operation are used, in contrast to three cycles as used for negative total operations, the timing of certain functions during negative subtotal operations must be delayed to a cycle subsequent to that employed in negative total operations. This is accomplished as fully set forth in U.S. Patent #2,658,659 wherein the various control cams on the negative total shaft 417 are formed as double edged cams, the cam edges on the right being located around shaft 417, so as to effect a timing of the sequence of operations of the overdraft control devices for negative subtotal operations. As fully described with reference to FIG. 8 of said Patent #2,658,659, an operation of the subtotal key 273 controls the adjustment of means for effecting a lateral displacement of shaft 417 so as to bring the negative subtotal control cams into active position. To simplify the description herein, therefore, it will be understood that, except as hereinafter described, the overdraft devices will function during the first three cycles of a negative subtotal operation in the manner previously described for a negative total operation, and as modified by the devices of Patent #2,-658,659 for the subtotal operation of four cycles.

In the lateral displacement of shaft 417 for a negative subtotal control it will be noted that tooth 485' (FIG. 3) of the supplemental indexing means for said shaft is displaced to one side out of cooperation with the pawl 483, so that an indexing of shaft 417 on the forward stroke of a third cycle of operation is now disabled. The shaft 417 in subtotal overdraft operations is indexed a quarter turn for each of the four cycles of subtotal overdraft operations by the regular indexing means, described in connection with FIG. 2.

With reference to FIGS. 5–5a, the right end portion of the cam 444 is provided with diametrically opposed cam surfaces 444', so that, following the end of the first and third cycles of a negative subtotal operation latch 442' will be held in engagement with the depressed lever 438. It is recalled that engagement of latch 442' with arm 438 serves to hold locking bail 504 in engagement with the stops 435, so that the complemental total will be stored in said stops following the first cycle of operation, and the true negative total value will be stored in the stops following a third cycle of operation. A fourth cycle of operation thereafter subtracts the true negative total stored upon stops 435 from the cleared register so that following said operation the register contains the complemental total value.

At the end of the third cycle of operation cam 444' in holding latch 442' in engagement with lever 438 will thereby hold the arm 572 (FIG. 7) and pawl 574 in depressed position, and clutch lever 577 will thus fail to be released in time to prevent the occurrence of a second readout operation of clutch means 569. Therefore, special means are provided, adapted to effect a release of pawl 574 from projection 576 of operated clutch lever 577, as hereinafter described. It is recalled that for each rotation of readout cam shaft 565 the clutch member 569 makes two complete rotations. In the event that a power failure should occur while the machine is operating in a readout operation such failure would act to deenergize solenoid 629 and, if suitable preventing means were not provided, might cause release of pawl 574 from projection 576 before clutch 569 has completed a first cycle of rotation. Under such circumstances lever 577 could drop into engagement with clutch 569 at the end of said first cycle of rotation, stopping the readout means in out of time condition. To avoid this contingency a tooth 574' is provided on pawl 574, said tooth being adapted in the downward operation of said pawl to lock in engagement with the rearward surface of lug 576 to prevent such release of pawl 574 and thereby hold clutch lever 577 in operated position.

So that clutch means 569 will be limited to two cycles of operation only, corresponding to one cycle of cam shaft 565, a cam member 642 secured upon readout cam shaft 565 is adapted at a three-quarter cycle position of shaft 565 to engage with a roller 643 fast upon a slide shaft 644, having open end slot support upon shafts 565 and 578, and will impart a rearward movement to said slide. Slide 644 is provided with a cam surface 644' adapted upon rearward movement of said slide to engage lug 576 and rock clutch lever 577 clockwise to carry said lug downward out of engagement with the above-described tooth 574' of pawl 574. Switch member 480 (FIG. 6) has meanwhile, in an operation of cam 463' during the third cycle of operation, been opened to deenergize solenoid 629. Thus the release of lug 576 from pawl 574 will enable said pawl to be rocked counterclockwise by spring means (not shown) within the solenoid 629. Pawl 574 is tripped free of lever 577 at substantially one and a half cycles of rotation of clutch member 569, so that lever 577 reengages with said clutch member in the full cycle position at the completion of the second cycle of rotation of said clutch.

Under conditions in which automatic multiple cycles of operations are involved, such as described for negative total operations, or at such times as a manual operation of a function control key is effected while a readout is still in process, the subsequent cycles of operation of the lister calculating devices must be held up until the readout and tape perforating operation related to an initial cycle of operation is completed. To accomplish this the following means are provided.

Loosely mounted upon a transverse rod 649 (FIG. 3) is an upwardly extending lever 650 provided with a lateral projection 651 normally in engagement with the lower surface 652' of a cam member 652, fast upon the readout cam shaft 565. Immediately upon the clockwise operation of shaft 565 in effecting a readout operation cam 652 imparts a clockwise operation to lever 650, and the rearward edge of said lever engaging a lug 653 on the forward end of a slide member 654 will act to impart a rearward movement to said slide. The rearward end of slide 654 is provided with a downwardly extending arm 654' which, in the forward position of slide 654, is spaced forwardly of clutch lever 106, so that in a first release of latch 112 from lever 106, in the manner earlier described, lever 106 will be free to rock and release the cyclic clutch means 103—104. Following the above-described rearward movement of slide 654 by cam surface 652, however, the cam member 652 acts to hold said slide in rearward position and arm 654' will prevent a second operation of said clutch lever 106 until after cam 652 releases slide 654 for forward movement, following a completion of the readout operation. Slide 654 is adjacent to the control slides 74, 81, earlier described, and is supported in similar manner to extend rearwardly beneath the bails 49. The upper surface of slide 654 is provided with a plurality of upwardly extending hook shaped projections 655, said projections, in the normal forward position of slide 654, being forward of the corresponding bail 49 of the related functions control keys. In the above-described rearward movement of slide 654, however, projections 655 are carried rearwardly and will pass beneath the normally raised bails 49. The active bail 49 related to a depressed function control key, however, is held by said key in lowered position and the related hook projection 655 in such case engages the upper surface of said bail and will hold the active bail in its depressed position even though a completion of the cyclic devices of the lister calculator has released the locking slide 44, earlier described, for the function control keys. Therefore, any related switch means 579 (FIG. 5), previously described in connection with a function control identification perforation of the tape means 518, is caused to be held in operated condition until after a readout operation has been completed.

As illustrated by the wiring diagram of FIG. 17, means are provided for advancing the tape 518 under control of a manually operated switch member 660 (FIG. 1). Upon a depression of switch key 660 negative circuit is established from rectifier 584, through lead 583, closed switch 660, and thence, through common lead 662, to the negative side of both the feed hole solenoid 519 and to a paper feed relay member 663. Plus side for both feed hole solenoid 519 and said relay 663 are connected to the plus side of rectifier 584, through leads 591, 593 and the normally closed switch 592 (FIG. 13) which switch it will be recalled is opened and closed during each operation of the tape advance means 533 upon the energizing and deenergizing operations of the tape drive solenoid 532, as previously described. Thus a closure of switch 660 acts to immediately energize both the feed hole solenoid 519 and also relay member 663, and it will be observed that as long as key 660 is held in depressed position by the operator a negative circuit will be maintained to both feed hole solenoid 519 and the relay member 663. Associated with relay 663 is a contact bar 664 normally held, when said relay is in deenergized condition, free of a pair of contact members 665—666. Contact 665 has circuit connection with terminal ground lead 583, and contact 666 has connection, by means of lead 668, to negative side of the tape advance solenoid 532. Upon energizing of relay 663 bar 664 is moved into engagement with contact pins 665—666 and extends negative circuit to the tape advance solenoid 532, so that said solenoid becomes energized and effects a setting operation of the tape advance means, as in the manner heretofore described. A capacitor C, connected in parallel with relay coil 663 together with the charging resistor R, form a time delay circuit designed to delay the pull in of relay switch member 866, with its consequent deenergization of feed hole magnet 519 via switch 592, until after the feed hole magnet 519 has had time to punch. During the setting stroke of solenoid 532 switch means 592 is caused to be opened and will break plus circuit to feed hole solenoid 519, as earlier set forth, and will also at this time open plus circuit to relay member 663. Relay 663 will thus become deenergized and will remove bar 664 from contacts 665—666, thereby breaking negative circuit to the tape advance solenoid 532, and said solenoid is restored by the spring means 538 (FIG. 13) while effecting an operation of tape advance pawl 536. At the end of the paper feed stroke, arm 533 recloses switch 592 and a second operation of solenoid 519 and relay 663 will be effected, which again operates the advance solenoid 532 for a second feed operation. Thus successive operations of feed hole punch 519 and relay 663 in alternate manner with operations of the tape advance solenoid 532 will continue until such time as switch key 660 is released by the operator to again open the master circuit from negative terminal lead 583.

If an error is made by the operator either in the set up or operation of the lister calculator, it is desirable that an error identification be recorded upon the tape means 518. Therefore, means for effecting suitable coded tape perforations indicative that an error has been made are provided, as will now be described.

With reference to FIG. 1 and to the wiring diagram of FIG. 17, whenever an error is observed the operator will immediately depress a switch key 670, mounted within the top plate of the punch unit 510. Depression of switch key 670 is adapted to close a normally open contact means 670' related to said switch and will thereby extend negative circuit from terminal lead 583 to one terminal of a relay member 671 via the pulsing capacitor $C_2$. The opposite terminal of relay 671 being connected through leads 672 and 641 to plus terminal lead 593 said relay will become energized at this time and effect a closing of the contact members 673, 674 and 675, comprising a gang switch associated with said relay. Contact 673 has circuit connection by means of lead 620 to the lead 585 connected to the number two punch solenoid 528, contact 674 has connection by means of lead 676 to the lead 585 for the number four punch solenoid and contact 675 is connected through lead 677 to the number five punch solenoid. The opposite terminal of the above-described gang switch is connected by means of circuit lead 678 to the negative terminal lead 583, so that upon energizing of relay 671 and consequent closure of contacts 673—675 circuit is established to energize the numbers two, four and five punch magnets 528—528' and effect a simultaneous perforation in channels two, four and five of the tape 518, indicating thereby that an error has been made in an operation performed upon the lister calculator. Only one such error punch will take place due to the fact that relay 671 will only be momentarily energized during the charging of condenser $C_2$. Resistor $R_2$ is provided to form a discharge path for $C_2$ on the release of single pole double throw switch 670. Capacitors $C_3$ and $C_4$ together with associated resistors $R_3$ and $R_4$ are provided for spark suppression purposes as is well known in the art.

The control devices earlier described for effecting operation of the readout clutch means 569 shown in FIG. 7 includes an interponent member 574 which is set and thereafter held in a clutch releasing condition by the energizing of the rotary solenoid 629. Interponent 574 it will be recalled is mounted upon a power arm 572 operated by the register/printing cyclic devices and, therefore, in any subsequent operations of the printing calculator following said setting will cause a release of clutch 569 and effect thereby automatic operations of the readout devices. Such an arrangement of the control means for releasing clutch 569 is particularly adapted to those machines the use for which in most cases will require that a perforated record be made relative to operations which customarily involve a lengthy series of entries to be effected upon the register/printing devices.

With reference to FIGS. 19–20 a modified form of control means for clutch 569 is shown, in which rotary solenoid 629 is caused to be energized momentarily during each operation of the register/printing cyclic devices, and wherein the said solenoid will act directly to release the clutch 569 for operation.

With reference to FIGS. 5 and 17, it will be recalled that in the devices heretofore described a normally closed switch 477 is placed in the ground circuit 583 to solenoid 629 and that said switch is caused to be opened in an operation of the overdraft control lever 418. Thus, in the control of negative totalizing operations, ground circuit 583 to solenoid 629 being opened a release of readout clutch 569 is disabled and no automatic operation of the readout devices will occur during certain preliminary control cycles of operation of the register/printing devices required for the converting of complemental total values to true negative total values, as earlier described.

Also in order to effect an energizing of solenoid 629 for releasing clutch 569 at the proper time in overdraft operations so that an automatic readout of the true negative total or subtotal value is effected, it will be recalled that a special switch means 480 (FIG. 6) is included in parallel circuit with switch member 477 to the solenoid 629, said switch 480 being operated through selective cam means 463—463' of the negative total control devices, as earlier set forth.

In the modified form of the control devices illustrated in FIGS. 19–20 the above special switch 480 has been eliminated, and in place of the normally closed control switch 477 there has been substituted a normally open switch member 477'. Switch 477' is adapted to be closed momentarily during regular cyclic operations of the register/printing devices in the following manner.

Fulcrumed upon a fixed support rod 382 is a multi-armed bail member 383, said bail being biased in a counterclockwise direction by a spring 384 secured at one end to an upwardly extending arm of the bail and at the opposite end to a screw stud 385, fast within the rod 382. Upon a forwardly extending arm of bail 383 is mounted a roller 386 having engagement with a cam edge of an arm 387 which is pinned to a transverse shaft 302. Shaft 302 is connected through means of arm 327 and link 328 (FIG. 3) to the rock arm 316, so that in each operation of the cyclic clutch devices 104—105, earlier described, shaft 302 is given a reciprocatory operation. Thus in each forward stroke of a machine cycle of operation the cam arm 387 is caused to be operated in a counterclockwise direction (FIG. 20), whereby the cam surface thereof will fall away from the roller 386 and unless otherwise deterred, bail 383 will be yieldably operated in a counterclockwise direction under influence of the spring 384. A rearward arm 383' of bail 383 overlies an offset arm 388 of the switch means 477' and near the end of the forward stroke of the operating devices above-described arm 383' engages arm 388 and will effect a closure of switch 477' so that, assuming the manual on/off switch means 636 (FIGS. 1 and 17) to be set to "on" or closed position, a circuit is then established to effect an energizing of the rotary solenoid 629 of FIG. 19. As in the manner earlier set forth, said energizing of solenoid 629 will cause the solenoid to effect a clockwise operation to the shaft 630 and to arm 631 fast thereon.

In the modified form of the control means for clutch 569 illustrated in FIG. 19 arm 631 has link connection 389 with the clutch pawl 577 and during the above-described operation of arm 631 link 389 will move downwardly rocking pawl 577 out of engagement with clutch 569, to immediately start operation of the readout cam shaft 565 earlier described.

While a readout operation by clutch 569 is in progress, the cam arm 387 will meanwhile in the return stroke of the register/printing cyclic devices impart a clockwise restoring operation to the bail 383, whereupon arm 383' of said bail, during the first portion of said restoring operation, releases switch 477' to reopen the circuit and thereby deenergize the solenoid 629. Upon deenergizing of solenoid 629 a suitable spring within the solenoid (not shown) then acts to restore the clutch pawl 577 and its associated parts toward normal clutch reengaging position, pawl 577 being adapted to ride the peripheral diameter of the clutch 569 until a full cycle position of rotation of said clutch permits the reengagement of said pawl therewith to stop the operation. It will be recalled, however, that the cam shaft 565 has drive connection through a 2:1 reduction gearing with clutch member 569, so that said clutch must make two cycles of rotation relative to each operation of shaft 565. Therefore, to prevent a reengagement of pawl 577 with clutch 569 at the completion of a first full cycle of rotation, which would terminate the readout operation prematurely, the following means are provided with relation to the devices shown in FIG. 19.

A slide member 644, having open end slot support upon shafts 578a and 565a, is provided with a lug 644b adapted in a leftward displacement of said slide to be brought into engagement with a lug 576 of clutch pawl 577.

Pinned to the cam shaft 565 is a cam member 642a, adapted for engagement with a roller 643a fast upon said slide 644a. Cam 642a is timed in an operation of shaft 565 to engage roller 643a and effect a leftward movement to the slide 644a near the end of a first half cycle of rotation of said shaft, so that the said displacement of slide 644a will occur before the clutch member 569 completes its first cycle of rotation, whereupon lug 644b in the leftward movement of said slide engages lug 576 and will hold clutch pawl 577 in a rocked position out of engagement with clutch 569, so that said clutch is permitted to continue in operation for a second cycle of rotation. During a second cycle of rotation of clutch 569 the cam 642a is rotated free of roller 643a and will release slide 644a, so that pawl 577 at the completion of said second cycle will now be permitted to reengage with clutch 569 and terminate the operation thereof.

As heretofore described, in a reading out of the complemental total values from the register wheels as a true negative total amount a plurality of machine cycles will be required for converting the complemental total to a true negative total before the readout operation is to be effected. In the earlier described devices a control of clutch 569 by solenoid 629 for causing a readout operation during negative total or subtotal operations was effected through means of two switch members 477, 480 (FIGS. 5 and 7) arranged in parallel circuit with the solenoid 629.

In the modified control devices for clutch 569 shown in FIGS. 19–20, however, the single switch member 477′ is adapted to be controlled by the negative total devices to time the energizing of solenoid 629, so as to release readout clutch 569 only during a selective cycle of operation of the register/printing devices in accordance with automatic negative total or subtotal cyclic operations.

With reference to FIG. 5, the overdraft devices are put in operation, as earlier described, by the counterclockwise operation of control lever 418, lever 418 being released from latch member 420 in a movement of the higher order rack arm 610 preliminary to the start of operations of the cyclic devices during an overdraft totalizing operation, in well-known manner.

Loosely supported upon the transverse shaft 432 is a bail lever 474 (FIG. 20) having one arm 474′ thereof in engagement with the cross member 418′ of lever 418 so that said bail in the normal latched position of lever 418 is held in a clockwise position, against tension of suitable spring means 475. The upper end of bail lever 474 is connected by link means 477 to a latch pawl 479, and in the normal condition of the parts set forth above said pawl is thus held free of a projection 480 of the operating bail 383 related to switch 477′.

In a release of lever 418 for putting the overdraft devices into operation, however, cross member 418′ moves away from arm 474′, so that bail 474 is thereupon permitted a slight counterclockwise movement by spring 475, until stopped by engagement of a projection 474″ of bail lever 474 with a cam member 476 fast upon indexing shaft 417. Counterclockwise operation of bail 474 rocks latch pawl 479 into engagement with the projection 480 of switch operating bail 383, so that during the automatic machine cycles in overdraft operations bail 383 is now prevented from following the cam surface of arm 387, whereby no operations of switch 477 can be effected until the latch pawl 479 is released later relative to a selective cycle of the overdraft operations as follows.

It is recalled that for a negative total control operation three automatic machine cycles of operation are required, while in the negative subtotal operations four machine cycles are required, and that in a return stroke during each machine cycle suitable well-known indexing means 428—429 (FIG. 2) earlier described act to index the control shaft 417 one quarter turn of rotation. Also, that supplemental indexing means 483 (FIG. 3) operates during a forward stroke of the third machine cycle of operation to impart a quarter turn to the shaft 417.

For an automatic readout of true negative total amounts, which are to be effected in the third automatic machine cycle of operations, cam member 476, upon indexing of shaft 417 for a second quarter turn during a return stroke of the parts relative to the second automatic machine cycle of operation, will act to engage with projection 474″ and rock the lever 474 clockwise, thus moving latch pawl 479 out of engagement with the lug 480. Thereafter upon a third machine cycle of operation, as arm 387 moves away from roller 386, the bail 383 now moves under influence of its spring 384 to close contact switch 477′ and energize solenoid 629 and thereby effecting operation of the readout clutch 569. During said third cycle of operation cam shaft 417 is indexed a quarter turn in the forward cycle by the supplemental indexing means 483 and again a quarter cycle by the regular indexing means 428 in the return stroke, as earlier described, and cam 476 will have completed a full rotation to be again free of projection 474″, as shown in FIG. 20. During said final machine cycle, however, control lever 418 will have been restored as in the manner fully described earlier, so that crossover portion 418′ of said lever again holds lever 474 as illustrated, and hook 479 now remains free of the lug 480.

For negative subtotal operations hook 479 is similarly released for engagement with lug 480 to prevent operations of switch 477′ in this instance until a fourth cycle of machine operation, hook 479 being timed for release from lug 480 during a third machine cycle relative to negative subtotal operations through means of a cam member 476′, fast upon shaft 417 and adjacent to the cam 476. Cam 476′ is normally positioned out of plane with projection 474′ of lever 474 and is adapted to be brought laterally into co-operation with said projection in the displacement of shaft 417 for negative subtotal operation, in the manner and purpose fully described earlier in the specification.

It will be appreciated that changes in the details of construction as shown and described may be made by those skilled in the art without departing from the spirit and scope of this invention as defined in the appended claims.

Having now disclosed novel means whereby amounts entered in one system of notation upon the keyboard and registering devices of a lister calculating machine are translated through mechanical encoding devices into a coded system of notation which are electrically interpreted to cause operations of selective punch means for effecting a coded perforated record representative of said entries upon a tape means, and wherein said translating and punch control operations are accomplished without increasing a load build-up upon the actuator devices for said lister calculator machine, or the restricting of normal nonperforating control operations performed upon said machine at normal machine speeds:

I claim:

1. In a machine of the class described, the combination including registering and printing devices, a plurality of reciprocatory differentially movable actuators, cyclic operating devices, a plurality of denominational banks of digit value keys adapted for controlling an extent of movement of the related differential actuator, a digit value storage member for each denominational order displaceable in accordance with a digit value operation of the related actuator, encoding plates mounted to each of said storage members for displacement therewith and having a plurality of uniformly depressed areas and a plurality of uniformly raised areas, means operable in an operation of said cyclic devices to lock all the said plates in value adjusted condition throughout a return operation of said actuators, a plurality of flexible sensing members related to each order of said encoding plates, an independent clutch releasable for independent operation in an operation of said first cyclic devices, cam means operable during a cycle of operation of said independent clutch for successively operating each order of said sensing members into engagement with said encoding plates, means operable by said independent clutch for maintaining the said locking means effective following the completion of an operation of the said cyclic operating devices, and wherein said sensing members during said successive order operation thereof will be displaced in accordance with the raised or depressed areas of said encoding plates presented thereto and thereby effect sequential denominational order coded representations of digit values entered upon said storage members.

2. In a combined lister calculator and tape punching machine the combination of register/printing devices, differentially movable actuators for controlling digit value operations thereof, cyclic operating devices therefor, value translating means including encoding plates settable in accordance with digit value operations of the related order actuators and wherein said plates are provided with a plurality of uniformly raised areas and a plurality of uniformly depressed areas, a plurality of sensing fingers related to each order of said plates and co-operable therewith for selective displacement in accordance with said areas presented to said fingers by a digit value setting of said encoding plates, a plurality of punch members adapted for effecting perforations coded in accordance with selective operations of said sensing fingers under control of said encoding plates, and cyclically driven cam means adapted during a cycle of operation thereof to sequentially displace successive orders of said fingers for reading out said encoding plates whereby to sequentially translate into coded circuits the successive orders of digit values and thereby effect a successive series of coded perforations as in accordance with the denominational orders of selected digit values.

3. In a combined lister calculator and tape punching machine the combination of register/printing devices, differentially movable actuators for controlling digit value operations thereof, cyclic operating devices therefor, value translating means including encoding plates settable in accordance with digit value operations of the related order actuators and wherein said plates are provided with a plurality of uniformly raised areas and a plurality of uniformly depressed areas, a plurality of sensing fingers related to each order of said plates and cooperable therewith for selective displacement in accordance with said areas presented to said fingers by a digit value setting of said encoding plates, a plurality of punch members adapted for effecting perforations coded in accordance with selective operations of said sensing fingers under control of said encoding plates, and cyclically driven cam means adapted for displacing successive orders of said fingers for reading out said encoding plates, an independent clutch in the drive for said cam means, release means for said independent clutch operable automatically by an operation of the register/printing cyclic devices, electromagnetic means for controlling operations of said release means and a manual on/off switch in the circuit for said electromagnetic means to selectively determine operation thereof.

4. The invention in accordance with claim 3 including a support shaft for said cam means, a reduction gear train between said clutch and said cam shaft, whereby two cycles of operation of said clutch will effect one cycle of operation of said cam shaft, and a means operable by said cam shaft during a first cycle of rotation of said independent clutch to cause an automatic operation of said clutch release means and effect thereby a second cycle of operation of said independent clutch.

5. The invention in accordance with claim 4 and having an electric motor including normally open switch means in the circuit therefor, means for closing said switch to start the motor and effect operation of the register/printing cyclic devices, means to automatically reopen said switch upon terminating said cycle of operation, a second normally open switch for said motor, means operable in an operation of said cyclic devices for closing said switch and effect parallel circuit to the motor whereby said motor will continue in operation following said reopening of said first switch and thereby complete the sequential operation of said sensing fingers, and means subsequently operable by the said independent cyclic means during said second cycle of operation for reopening said second switch to stop the motor.

6. The invention according to claim 3 including a normally open second switch in series circuit with said on/off switch and said electromagnetic means, and means normally operable in an operation of the register/printing cyclic devices for effecting operation of said second switch to cause operation of said electromagnetic means and wherein said operation of the electromagnetic means releases said clutch for effecting a readout operation of said encoding elements.

7. The invention according to claim 6 and wherein closure of said second switch is caused to be effected in a forward movement of the register/printing cyclic devices following the said displacement of the encoding plates by said devices, and wherein said closure of said switch effects a timed release of said independent clutch whereby a sequential readout of said encoding elements is caused to take place concurrently with the subsequent return operation of the register/printing cyclic devices.

8. The invention according to claim 7 and having control devices adapted for effecting a sequence of automatic cycles of operations of the register/printing cyclic devices; and wherein the means normally operable for effecting operation of said second switch includes a member yieldably operable in operations of said cyclic devices, and wherein the said automatic cyclic control devices include a means for disabling operation of said member for the purpose of disabling the operation of said second switch and thus prevent a readout operation of the encoding elements during selective cycles of operations of the register/printing devices relative to said sequence of automatic operations, and including means for releasing said member for a subsequent operation in a selective cycle of operation of the register/printing devices for the purpose of closing said switch and effecting automatic operation of said electromagnetic means and thereby release the said independent clutch, whereby a readout operation of the encoding elements as conditioned in said later selective cycle of operation of the register/printing devices is effected.

9. The invention in accordance with claim 3 including a power arm operable in operations of the register/printing cyclic devices, an interponent movable with said power arm and normally ineffective of said clutch release means, and wherein said electromagnetic means is adapted upon a setting of said on/off switch to on circuit position to adjust said interponent to active position, whereby in subsequent operations of said power arm said interponent will thereafter automatically cause operations of said clutch release means for effecting said successive readout operation of said encoding plates by said sensing members.

10. The invention according to claim 9 and including means whereby said operation of said power arm is caused to be effected near the end of a forward stroke of the register/printing devices whereby the said successive readout of the encoding plates will occur in part with a return stroke of the said register/printing devices.

11. The invention in accordance with claim 10 and having program control devices including means for automatically effecting repeated operations of the register/printing cyclic devices; means operable by said program control devices for disabling said interponent and thereby prevent repeated operations of the readout/punch devices during said repeated program controlled operations of the register/printing devices, means cyclically indexed by the register/printing cyclic devices during said program operations, and means operable by said indexing means to reenable said interponent whereby subsequent operation of the register/printing cyclic devices during said program operations will effect an operation of said interponent and release said clutch for effecting operation of said readout/punch devices.

12. The invention in accordance with claim 10 and including program control devices adapted for effecting automatic multicyclic operation of the register/printing devices, contact means in circuit with said electromagnetic means and operable by the said program control devices to control an operation of said electromagnetic means for disabling said interponent and so prevent repeated readout operations during said multicyclic operations, a second contact switch in circuit with said electromagnetic means, control means for said second switch including means indexed by the cyclic devices in cyclic operations effected under control of said program control devices and adapted to control operation of said electromagnetic means to reenable said interponent relative to releasing said clutch, and wherein a continued operation of the cyclic devices during said program controlled operations thereafter effects an operation of the said interponent to release the said clutch for operating the readout/punch devices and effect thereby a coded perforated record upon the tape in accordance with the amount registered upon said register/printing devices in the said continued operation of the cyclic devices.

13. The invention in accordance with claim 10 and having totalizing means for the register/printing devices, program control devices adapted for effecting a plurality of successive registration upon the register means and thereby convert a complemental total registration appearing upon the register devices to a true negative total value thereon; a normally closed switch member in the circuit for said electromagnetic means, means operable by said program control devices for disengaging said switch to deenergize said electromagnetic means and thereby restore said interponent to an ineffective condition relative to said clutch means, whereby an operation of the readout/punch devices will be prevented during a first cycle of said program controlled operations, a normally open switch member in the circuit for said electromagnetic means wired in parallel with said normally closed switch, means effective under control of the program control devices and operable by the cyclic devices during a second of said program controlled cyclic operations to effect engagement of said normally open switch and thereby reenable said interponent relative to said clutch member, and wherein a subsequent operation of the cyclic devices effects operation of said interponent to release the said clutch and thereby effects operation of the readout/punch devices for perforating a coded record representation upon the tape in accordance with the true negative total amounts as entered upon the registering/printing devices during the said program controlled operation thereof.

14. In a machine of the class described the combination comprising registering and printing devices, a plurality of differential actuators therefor, cyclic operating devices, value storage sectors displaceable by the related differential actuator in accordance with a digit value operation thereof, means operable by the cyclic devices for locking said sectors in value adjusted position, means for translating said values to coded representations thereof including encoding sectors secured to each order of said storage sectors each provided with a plurality of raised surfaces and a plurality of depressed surfaces, groups of yieldable sensing fingers related to each of said encoding sectors and biased normally out of engagement therewith, a cyclic operating shaft including clutch means for effecting operations thereof independently of said first cyclic operating devices, a plurality of cam members related each to a corresponding order group of sensing fingers and arranged in helical manner upon said shaft for biasing the said groups of sensing fingers in successive denominational order toward engagement with the related encoding sectors, and wherein engagement of the sensing fingers of each group with the raised surfaces displaced according to selective digit values acts to prevent substantial operation of the related sensing fingers while any of said fingers in which depressed areas have been selectively positioned opposite thereto will be caused to be operated in an extended movement, and effect thereby a readout from successive denominational orders of the coded indications of the amounts entered upon said storage members.

15. The invention according to claim 14 and including a plurality of punch members adapted for effecting perforations within coded areas of a tape or other media, electromagnetic means for selectively effecting operations of said punch members, circuit means electrically connecting said magnetic means with a related sensing finger in each of said groups, a circuit bar in common to all of said sensing fingers, and wherein an operation of the sensing fingers in the said extended movement thereof effects engagement of said fingers with the said circuit bar for selectively effecting thereby an operation of the related magentic means, and wherein selective punches operable thereby will effect perforations within related coded areas upon said tape or other media in accordance with said readout operation.

16. In a combined lister calculator and punching machine the combination comprising registering and printing devices, a plurality of differential actuators therefor, cyclic operating devices, an electric motor, value storage sectors adapted for displacement by the related differential actuator according to digit value operations thereof, means operable by said cyclic devices for locking said sectors in value adjusted position, means adapted to translate said values into coded representations thereof including encoding sectors secured to each order of said storage sectors and having selective raised surfaces and selective depressed surfaces, a group of flexible sensing fingers corresponding to each of said encoding sectors and biased normally out of engagement therewith, an operating shaft having clutch means for effecting operations thereof by said electric motor independently of said cyclic devices, a cam member for each group of said sensing fingers said cams being arranged in helical manner upon said shaft and adapted for biasing successive groups of said sensing fingers toward engagement with the related order encoding sectors, and wherein engagement of any sensing fingers of the active group with any raised surface as displaced relative thereto according to the selective digit value setting will act to prevent a substantial movement of said fingers, while any of such fingers in which a depressed surface has been positioned opposite thereto will be caused to operate for an extended movement, a plurality of punch members adapted for effecting perforations within selective coded areas of a tape or like media, electromagnetic means related to each of said punch members and adapted for selectively effecting a punching operation thereof, circuit means electrically connecting each of said magnetic means with a related sensing finger in each of said groups, a circuit bar in common to all of the sensing fingers, and wherein such extended movement of any sensing fingers during a readout operation effects engagement thereof with said circuit bar and effects thereby an operation of the related magnetic means, whereby the related selective punch members will be operated to effect perforations within selective coded areas of said tape as related to the said operated sensing fingers.

17. The invention in accordance with claim 16 and having means adapted for initiating cyclic operations of the lister calculator, a normally open switch in the motor circuit adapted for operation by said cyclic initiating means to effect a closure of said switch for starting said motor, means operable by the cyclic devices to restore said switch to open condition at the conclusion of an operation of said cyclic devices, means operable during an operation of said cyclic devices to release the said independent clutch means and effect an automatic operation of said cam shaft, a normally open second switch member having parallel circuit to said motor, and means on said cam shaft adapted for effecting an operation of said second switch for the purpose of prolonging motor operation of said clutch and thus complete a readout and tape perforating sequence of operations after such restoral of said first switch means at the conclusion of an operation of the cyclic operating devices for the lister calculator has been effected.

18. The invention according to claim 17 and having means operable by said cam shaft to maintain the storage members and encoding plates locked in set position during the said prolonged operation of the readout and tape perforating sequence of operations.

19. The invention according to claim 17 including a plurality of function control keys adapted each to effect cyclic operation of the register/printing devices, and wherein operation of said devices acts to subsequently initiate automatic operation of said cam shaft for the readout/punch devices, a commutator switch device rotatable in an operation of said cam shaft and adapted to control selective coding circuits to the magnetically operable punch members including a contact comb sleeve provided with a plurality of contact wipers, said sleeve being fast upon the cam shaft and electrically insulated therefrom, a plurality of fixed contact pins arranged within a block of dielectric material in rows arced around said shaft, and wherein said wipers are caused to successively engage the contact pins of the related rows upon an operation of said cam shaft, a terminal circuit lead in common to all of the contact pins in one row, circuit leads extending from selected of said pins to selected of said magnetically operable punch members, a plurality of normally open contact switches each operable by a related of said function control keys for selectively extending circuit to a related of said magnetically operated punches, a circuit lead in common to said switches and one of said contact pins, and wherein operation of the coding commutator acts to successively bridge said master circuit contact pins with the successive groups of said contact pins and effect thereby operations of selected punches for perforating successive combinations of perforations upon the tape which identify the functional operations initiated by said function control keys.

20. The invention according to claim 19 and including a relay member adapted to be energized upon an operation of the switch identified with a total taking function control key, a gang switch operable by said relay and provided with a plurality of normally open contact members adapted for modifying the circuits between a plurality of said contact pins and a plurality of said electromagnetic punches, and wherein said energizing of said relay effects closure of said contacts whereby a subsequent operation of said commutator switch will now effect an operation of said plurality of punch members as controlled by said modified circuits and will effect thereby perforations within the tape indicative of a totalizing operation.

21. The invention in accordance with claim 19 and having means operable by the cyclic devices of the lister calculator for automatically restoring said function control keys; a normally inactive control slide related to said keys, and means operable in an operation of said cam shaft to displace and maintain said control slide in an active position for preventing any subsequent operation of the lister calculator devices by the said control keys during the sequence of operations of the readout and punch devices.

22. In a combined registering/printing and tape punching machine of the character described, the combination having registering/printing devices, reciprocable differentially operated actuators for each denominational order thereof, cyclic operating means therefor, value storage sectors displaceable by said actuators in accordance with digit value operations thereof, means for thereafter locking said sectors in value set position, a group of yieldable sensing fingers for each denominational order of said storage sectors, encoding plates fast to each of said sectors for displacement therewith to bring selective combinations of areas thereon indicative of coded identifications of the digit values to sensing line position relative to said sensing fingers, a contact bar in common to all of said sensing fingers, a plurality of linearly spaced punches for effecting perforations within a given channel of the tape, a solenoid related to each of said punches for effecting punching operations thereof, circuit leads connecting each of said solenoids with a corresponding of said sensing fingers in each denominational order, a cyclically operable cam shaft having a clutch in the drive therefor releasable during an operation of the register/printing devices, a plurality of cam members arranged in helical manner upon said shaft and adapted for displacing successive denominational orders of said groups of sensing fingers toward engagement with the corresponding order of said encoding plates, and wherein the said encoding plates selectively determine effective displacement of the related groups of sensing fingers for engagement with the said contact bar whereby a circuit is established to the corresponding solenoids to effect a combination of perforations by said punch members within selective channels of the tape during each successive denominational order operations of said sensing fingers.

23. The invention in accordance with claim 22 and having punch means operable during code punching operations to effect feed hole perforations in a given channel of the tape and means for advancing the tape between punching operations thereof, a solenoid for operating the feed hole punch, a normally open contact switch in the circuit thereof, a universal means operable in an operation of any of the code punch members for closing said switch to effect an operation of the feed hole punch, a toothed drum engageable with perforations effected by said feed hole punch, an oscillating means spring biased for advancing said drum, electromagnetic means including a solenoid adapted for conditioning said oscillating means to an advanced tooth position of said drum, a normally open switch in the circuit for said later solenoid, a pulse cam fast upon the cam shaft operating the sensing fingers said pulse cam being adapted for effecting repeated operations of said switch in a timed relation with said successive operations of the groups of sensing fingers, whereby said conditioning operations of the tape advance means is effected between the succeeding operations of the adjacent order groups of sensing fingers, a normally closed switch in a circuit common to one terminal pole of said punch solenoids, means operable in said conditioning operation of the tape advance means for opening said switch to deenergize said solenoids and effect withdrawal of the punch members, and wherein opening of said switch occurs prior to a release of the active fingers from the common circuit bar by its related cam member and thereby prevents arcing during said release, and wherein a continued operation of said pulse cam effects disengagement of the pulse switch to deenergize the tape advance solenoid and thereby release the said spring biased oscillating means for an advance stroke operation of the tape, and wherein said operation of said oscillating means effects a reengagement of the switch for closing said common side circuit to the punch solenoids.

24. A tape/card punch unit including a plurality of linearly spaced punch members, a plurality of operating levers each connected with a corresponding punch member, a pivot support rod in common to all of said operating levers, and wherein said operating levers are formed each of planar construction and spaced upon said rod in zoned relation with a corresponding punch member, a plurality of support shafts spaced in an arc around said pivot rod for said operating levers, a drive member for each of said punch members secured each upon the related of said shafts in a uniform linear zoned relation with the correspondingly zoned operating lever, a rotary solenoid secured to opposite ends of the adjacent shafts as in alternate manner and adapted for effecting a rotary movement to the related shaft, and wherein said rotary movement is imparted to the related drive member and corresponding operating lever for causing an operation of the related punch member, whereby all of said punch members in the perforating operation are operable in uniform moments of inertia.

25. The invention according to claim 24 and having tape advance means including a toothed drum engageable with continuous feed hole perforations within the tape, pawl and ratchet means for imparting intermittent movement to said drum, an operating support arm for said pawl, and wherein a selected one of said adjacent shafts is provided with an actuating member having pivotal connection with said pawl operating arm, spring means adapted for effecting operations of said arm whereby said pawl and ratchet means will advance said tape drum, a rotary solenoid fast to said selected shaft and adapted when energized to impart rotary movement to said shaft and thereby position the said pawl to an active condition for subsequent operation by the said spring means to advance the tape drum upon a deenergizing of said solenoid.

26. A punch unit for a machine of the class described adapted to effect coded perforations within selective channels of a tape or like media and comprising a plurality of code punch members having each a receiving notch in the stem thereof, a related operating lever engageable therewith being each of flat stock construction and mounted for pivotal movement upon a common shaft, opposed support frames for said shaft, a plurality of adjacent operating shafts mounted within said frames and being spaced angularly around said common shaft in a semicircular arc, a drive member fast upon each of said adjacent operating shafts and having pivotal connection with a related one of said punch operating levers, a group of rotary solenoids fast upon one of said support frames and being disposed thereon in a coplanar and angularly spaced apart relation, a group of rotary solenoids supported fast upon the opposed support frame and disposed thereon in a coplanar and angularly spaced apart relation in which said spacing is intermediate to the angular spacing of said first group, and wherein said solenoids are connected each to a corresponding one of said operating shafts at opposite ends of the adjacent shafts as in alternate manner.

27. The invention in accordance with claim 26 and wherein one of said solenoids effects operation of a selected punch member directed to perforating feed holes within a select channel of said tape, and including a normally open switch means in the circuit for said feed hole solenoid, control means for said switch including a universal means operable by any of said punch operating levers for closing said switch to thereby energize said feed hole solenoid and effect operation of the feed hole punch in conjunction with an operation of the code punch members in effecting coded perforations within selected channels of the tape.

28. The invention in accordance with claim 27 including a toothed drum engageable with said feed hole perforations, pawl and ratchet devices for imparting intermittent movement to said drum, an operating lever upon which said pawl is pivotally supported, an arm having pivotal connection with said lever, a support shaft for said arm, spring means biasing said operating lever for advancing said drum, a rotary solenoid fast to said shaft and adapted when energized to impart rotary movement to said shaft for conditioning said pawl to an advance tooth position, and wherein a subsequent deenergizing of said solenoid releases said pawl for operation by said spring means to effect a tape advance operation of said drum.

29. The invention according to claim 28 and including circuit means in common to one terminal side of all the said punch solenoids, normally closed contact means in said circuit, means for disengaging said contact means in the said conditioning operation of the tape advance means to thereby deenergize all the punch solenoids and restore the punch members to normal condition prior to an operation of said tape feed drum.

30. In a tape punching machine, means for effecting successive feed hole perforations within a tape and for advancing the tape between said perforating operations comprising the combination of punch means for perforating feed holes within a tape, a rotary solenoid for operating said punch, tape advance means including an oscillating ratchet means for feeding the tape between successive operations of the punch means, springs urged means for effecting a feed movement thereto, electromagnetic means including a rotary solenoid adapted to adjust the feed means to tape feed position, a time delay relay providing normally open contact devices in the circuit for said feed solenoid, circuit means including a manual control switch for closing the circuit and effecting simultaneous operation of the punch solenoid and said time delay relay, and wherein operation of said relay effects energizing of the feed control solenoid for adjusting the feed means to said tape feed position, circuit means including a normally closed switch member in common to said punch solenoid and said time delay relay, and wherein said operation of the feed control solenoid will open said switch to normalize the punch solenoid and the time delay relay whereby said normalizing of the punch solenoid withdraws the punch member from the tape while the normalizing of said time delay relay deenergizes the feed control solenoid and releases thereby the spring urged means for advancing the tape, and wherein operation of said spring means reengages the said switch member for closing the common circuit to said punch solenoid and to the said time delay relay, whereby an automatic successive punching and tape advance sequence of operations will continue until release of said manual control switch terminates such operations by breaking the said circuit means controlled thereby to the punch solenoid and time delay relay.

31. In a tape punching apparatus of the character described, means for punching successive feed hole perforations within a tape and to advance said tape between said punching operations comprising, a punch member, a rotary solenoid adapted to effect an operation of said punch, tape advance means including a drum having teeth engageable with said feed holes, pawl and ratchet means including an oscillating member spring biased for advancing said drum, control means for said oscillating member including a shaft having an arm thereon for pivotal and slidable connection with said oscillating member, a rotary solenoid fast to one end of said shaft adapted when energized to rotate said shaft and thereby adjust said oscillating member for indexing and maintaining said pawl in an advanced tooth position with respect to said ratchet means, a time delay relay adapted to provide normally open contact means in the circuit for the tape feed control solenoid, circuit means in common to a given terminal pole of the feed hole solenoid and said time delay relay including a normally closed switch operable under control of the tape advance solenoid, circuit means in common to the opposite poles thereof including a normally open manual key control switch therein, and wherein operation of said key switch effects a simultaneous operation of the feed hole solenoid to perforate the tape while the said relay effects operation of the tape advance solenoid to index said pawl to advance tooth condition, and wherein said conditioning operation of the tape advance means effects operation of said switch controlled thereby to deenergize said feed hole solenoid and said relay thereby withdrawing the feed punch while also reopening the circuit to deenergize the tape advance solenoid and permit a tape advance operation of said spring means, and wherein said operation of the spring means reengages the switch member controlled thereby for again effecting simultaneous operation of the feed hole punch and time delay relay, whereby successive alternate operations of the feed hole punch and tape advance means will continue until a release of said manual control key switch.

32. The invention according to claim 31 and wherein said oscillating member is provided with a tooth engageable with said ratchet means near the end of a tape feed operation thereof to prevent overrotation of said tape drum and to thereafter maintain said drum in precise position during the punching operations of the punch member.

References Cited in the file of this patent

UNITED STATES PATENTS

| | | |
|---|---|---|
| 1,834,561 | Watson | Dec. 1, 1931 |
| 2,049,719 | Peirce et al. | Aug. 4, 1936 |
| 2,127,733 | Herbst | Aug. 23, 1938 |
| 2,155,928 | Brand | Apr. 25, 1939 |
| 2,229,905 | Sundstrand | Jan. 28, 1941 |
| 2,239,524 | Johnstone et al. | Apr. 22, 1941 |
| 2,302,769 | Haselton et al. | Nov. 24, 1942 |
| 2,459,468 | Sundstrand | Jan. 18, 1949 |
| 2,615,623 | Pitman | Oct. 28, 1952 |
| 2,625,324 | Sundstrand | Jan. 13, 1953 |
| 2,659,767 | Zenner | Nov. 17, 1953 |
| 2,812,902 | Runde et al. | Nov. 12, 1957 |
| 2,861,739 | Chall et al. | Nov. 25, 1958 |
| 2,895,121 | Bliss | July 14, 1959 |

UNITED STATES PATENT OFFICE
CERTIFICATE OF CORRECTION

Patent No. 3,018,040                              January 23, 1962

Nathaniel B. Wales, Jr.

It is hereby certified that error appears in the above numbered patent requiring correction and that the said Letters Patent should read as corrected below.

Column 3, line 1, for "January 5, 1943" read -- September 28, 1943 --; column 6, line 25, for "1945" read -- 1941 --; line 33, after "engagement", first occurrence, insert -- with arm 86. Arm 86 is thereupon rocked counterclockwise --; same line 33, for "86" read -- 89 --; column 8, line 12, after "crank" insert -- lever --; column 11, line 47, for "June 1" read -- June 21 --; column 16, line 23, for "contract" read -- contact --; column 22, line 9, strike out "a"; lines 25, 31, 40 and 41, for "2,658,659", each occurrence, read -- 2,658,669 --; column 26, line 73, for "644" read -- 644a --; column 34, line 18, for "sheft" read -- shaft --; column 36, line 18, for "springs" read -- spring --.

Signed and sealed this 7th day of May 1963.

(SEAL)
Attest:

ERNEST W. SWIDER
Attesting Officer

DAVID L. LADD
Commissioner of Patents